June 19, 1962 J. C. LAWRENCE 3,039,768
SINGLE SHEET FEEDER
Filed Oct. 25, 1957 9 Sheets-Sheet 1

INVENTOR.
JAMES C. LAWRENCE
BY
*Reynolds, Beach & Christensen*
ATTORNEYS

INVENTOR.
JAMES C. LAWRENCE
BY Reynolds, Beach & Christenson
ATTORNEYS

June 19, 1962 J. C. LAWRENCE 3,039,768
SINGLE SHEET FEEDER

Filed Oct. 25, 1957 9 Sheets-Sheet 3

INVENTOR.
JAMES C. LAWRENCE
BY
Reynolds, Beach & Christensen
ATTORNEYS

June 19, 1962 J. C. LAWRENCE 3,039,768
SINGLE SHEET FEEDER
Filed Oct. 25, 1957 9 Sheets-Sheet 4

INVENTOR.
JAMES C. LAWRENCE
BY
Reynolds, Beach & Christensen
ATTORNEYS

June 19, 1962

J. C. LAWRENCE 3,039,768

SINGLE SHEET FEEDER

Filed Oct. 25, 1957

INVENTOR.
JAMES C. LAWRENCE
BY
Reynolds, Beach & Christenson
ATTORNEYS

INVENTOR.
JAMES C. LAWRENCE
BY
Reynolds, Beach & Christensen
ATTORNEYS

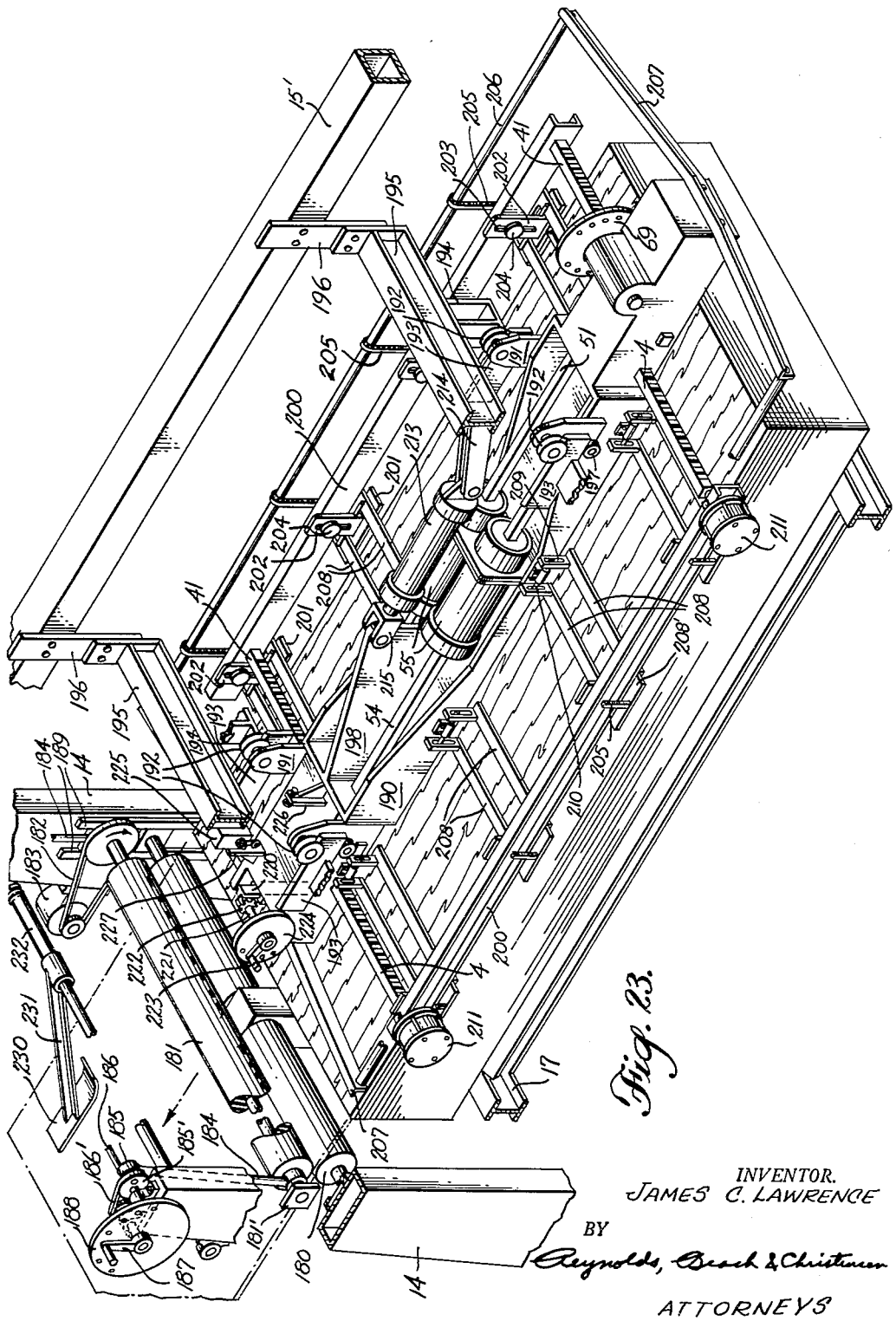

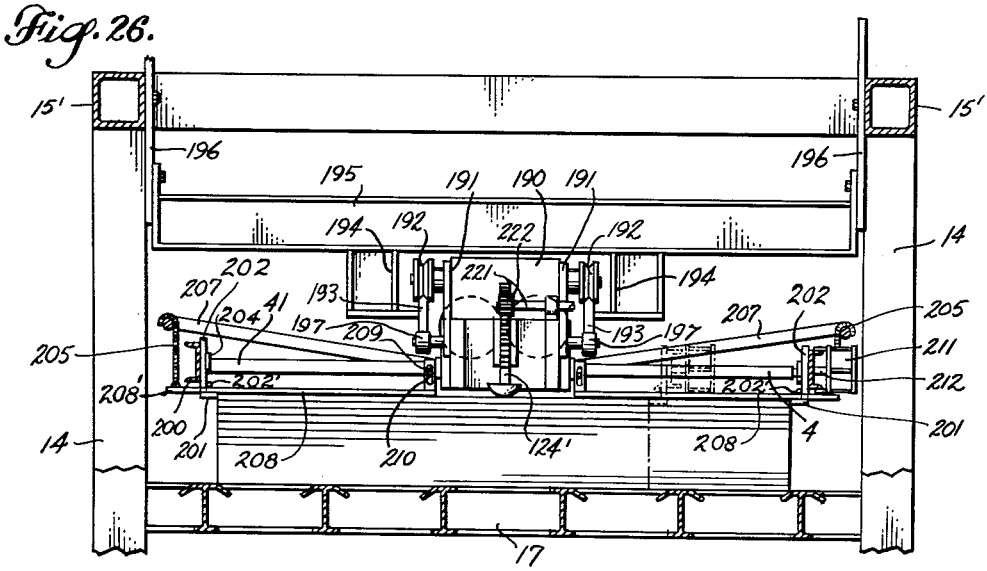
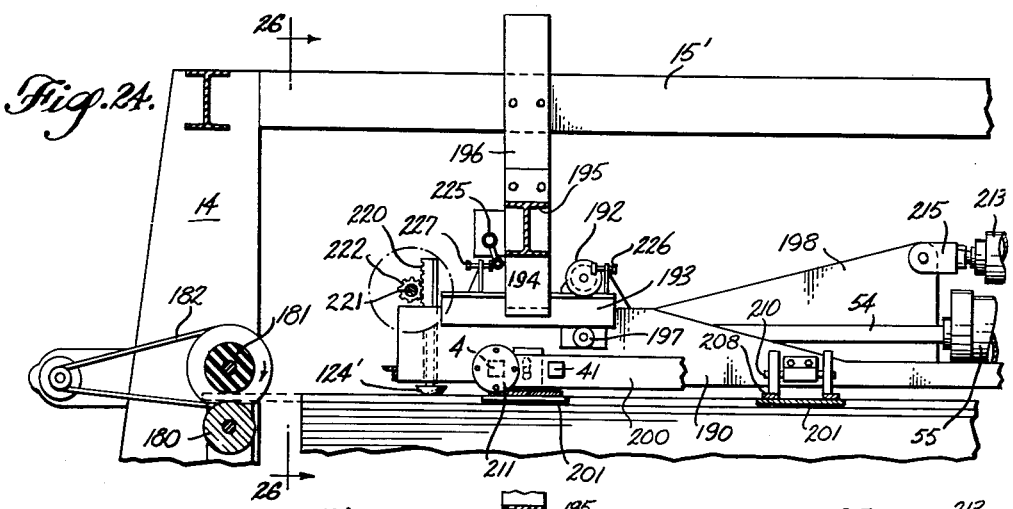
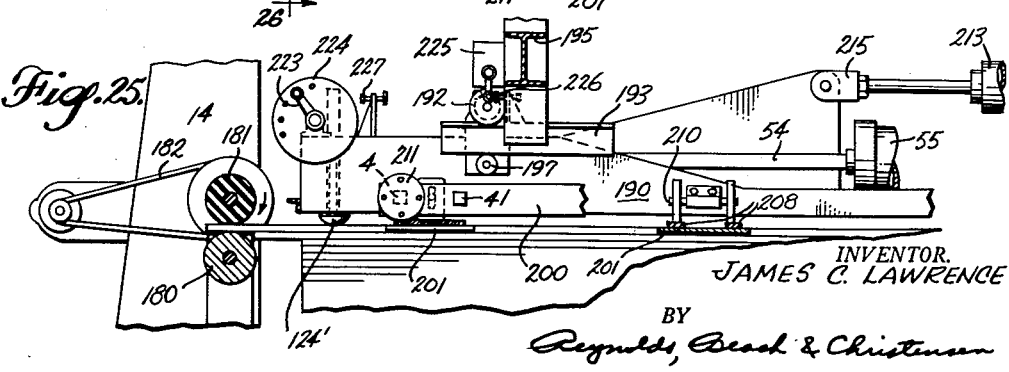

United States Patent Office 3,039,768
Patented June 19, 1962

3,039,768
SINGLE SHEET FEEDER
James C. Lawrence, 7911 10th Ave. S., Seattle, Wash.
Filed Oct. 25, 1957, Ser. No. 692,440
10 Claims. (Cl. 271—59)

The present invention relates to a feeder for feeding to a machine, such as a sander, for example, single sheets, such as of plywood, from a stack. This application is a continuation-in-part of my application Serial No. 488,643 filed February 16, 1955, now U.S. Patent No. 2,921,788.

In general, the purpose of the feeder is to receive a stack of closely piled sheets and automatically to feed these sheets edgewise, one at a time, from the top of the stack. An object of the invention is to provide such a sheet feeder which can handle large sheets of material, such as four feet by eight feet, and which can be adjusted readily to feed sheets of different width and length.

Another object is to provide a sheet feeder of automatic character which will receive a stack of sheets from a conveyor when the feeder is empty and lift such sheet stack until the upper sheet reaches a feeding station at a predetermined elevation, whereupon single sheets are fed edgewise from the top of the stack in sequence, and the stack of sheets is raised automatically, the thickness of one sheet between each sheet feeding operation, until all the sheets of the stack have been fed. When the feeder has thus been emptied, it will receive automatically another stack of sheets, and the sheets of this stack will be fed similarly in sequence.

A particular object of the invention is to position each sheet accurately before it is fed edgewise from the stack, so that it will be aligned precisely in predetermined position before being fed, and thence will be moved along a true path into the machine. An associated object is to enable alternate sheets to be fed from the top of the stack one offset in one direction and the next offset in the opposite direction a predetermined amount transversely of the direction of feed from a central location. If the sheets are fed to a sander, for example, such a feeding technique will produce even wear on the sanding rolls of the sanding machine.

An additional object is to provide suitable controls for such a sheet feeder so that the feeder may be stopped and started at the will of the operator, its speed of feed may be regulated, and the type of sheet feeding operation may be selected so that alternate sheets will be offset to opposite sides of a central position, as discussed above, or all the sheets will be fed from a central position, as may be desired.

The sheet feeder includes an elevator onto which a stack of sheets to be fed is delivered, and when in place upon the elevator it is automatically hoisted. When the top of the stack carried by the elevator reaches feeding elevation, the elevator movement automatically is stopped and automatically reciprocable squaring arms are moved to engage the top sheet edgewise and shift it transversely of the feeding direction as may be necessary to square the sheet with the feeding direction. Sheet feeding means then slide the sheet lengthwise from the top of the stack. As soon as this sheet has been moved substantially off the stack, upward movement of the elevator is initiated again to raise the stack a distance equal to the thickness of the sheet thus fed. Thereupon the squaring arms are reciprocated to square the new top sheet, and it in turn is slid off the top of the stack by the sheet feeding means. When all the sheets in the stack have thus been fed, the empty elevator automatically is lowered to receive another stack of sheets.

Details of the preferred sheet feeder mechanism are shown in the accompanying drawings and described hereafter, but it will be appreciated that many of such details may be altered within the scope of the invention.

FIGURES 6 to 15, inclusive, are diagrammatic views of the squaring arm drive pistons shown in various positions.

Figure 16:
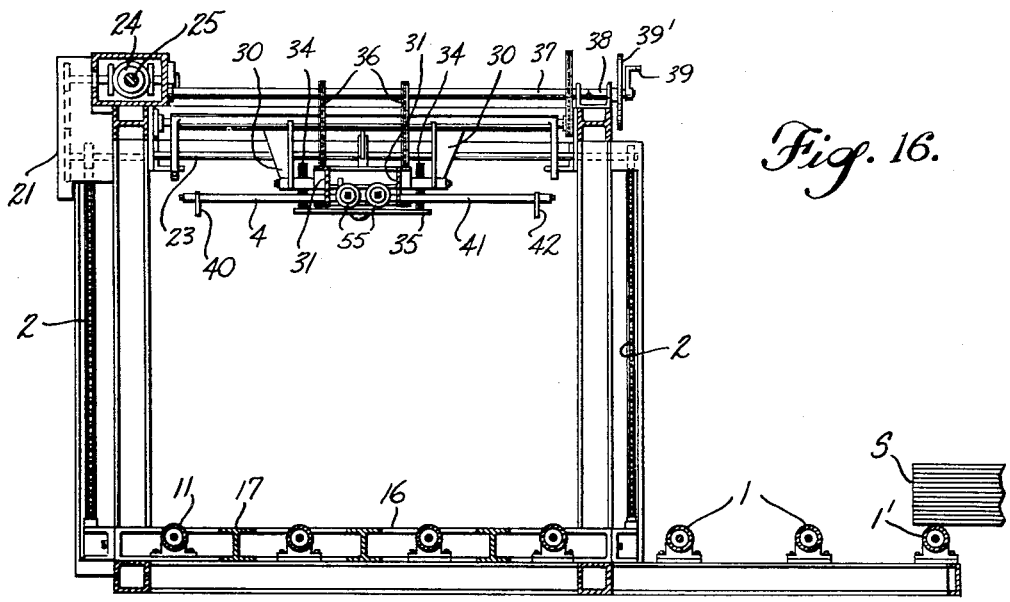

FIGURE 16 is a vertical transverse section through the sheet feeder.

Figure 18:
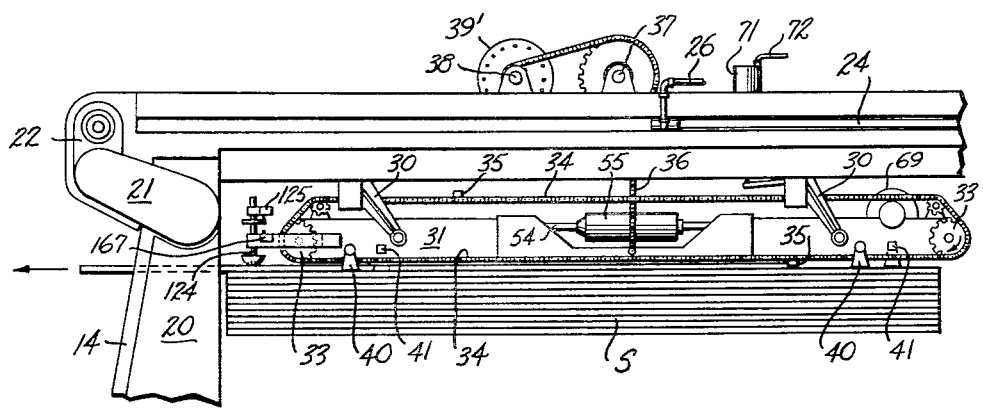
Figure 6:
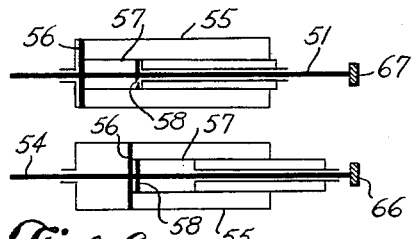
Figure 7:
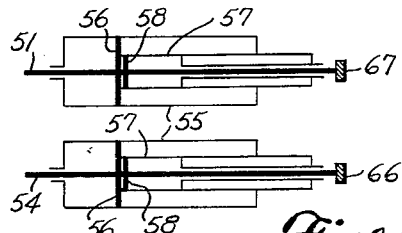
Figure 17:
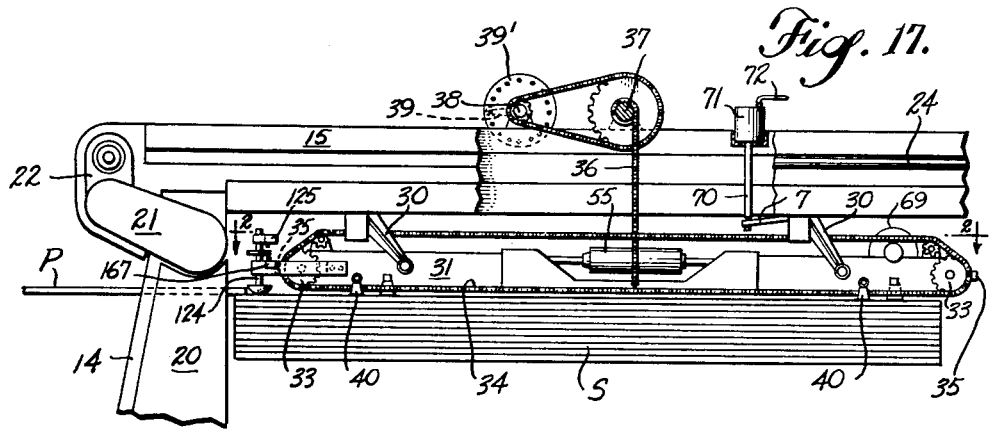
Figure 15:
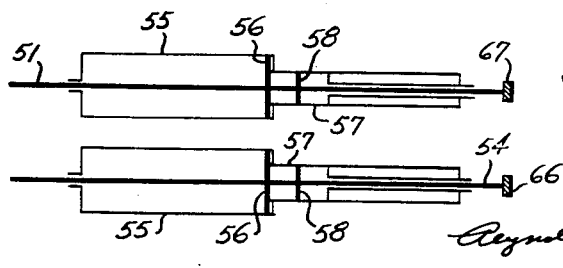

FIGURE 17 is a side elevation view of a portion of the upper part of the sheet feeder, and FIGURE 18 is a similar view with parts in a different operative position.

FIGURE 19 is a vertical sectional view through brake mechanism of the apparatus.

Figure 21:
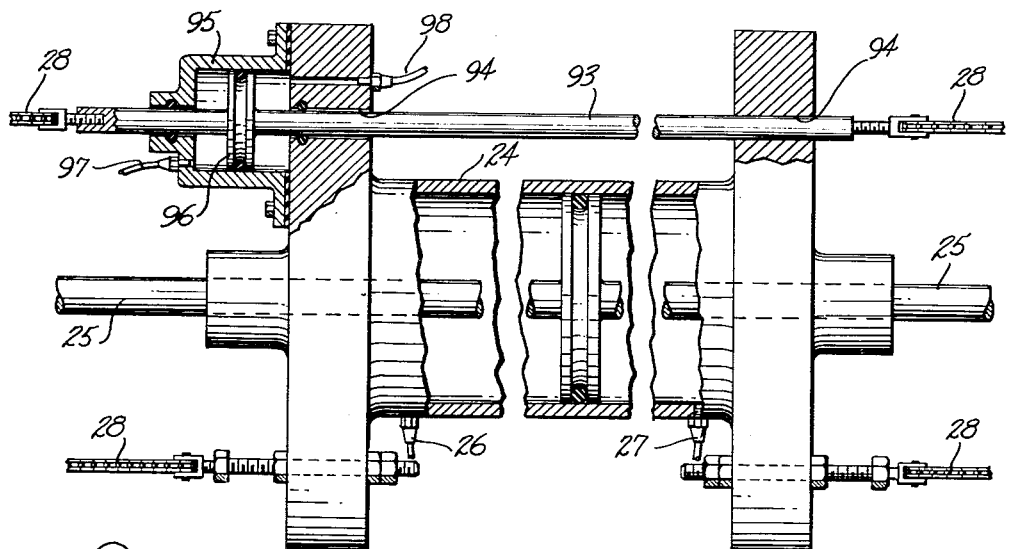
Figure 20:
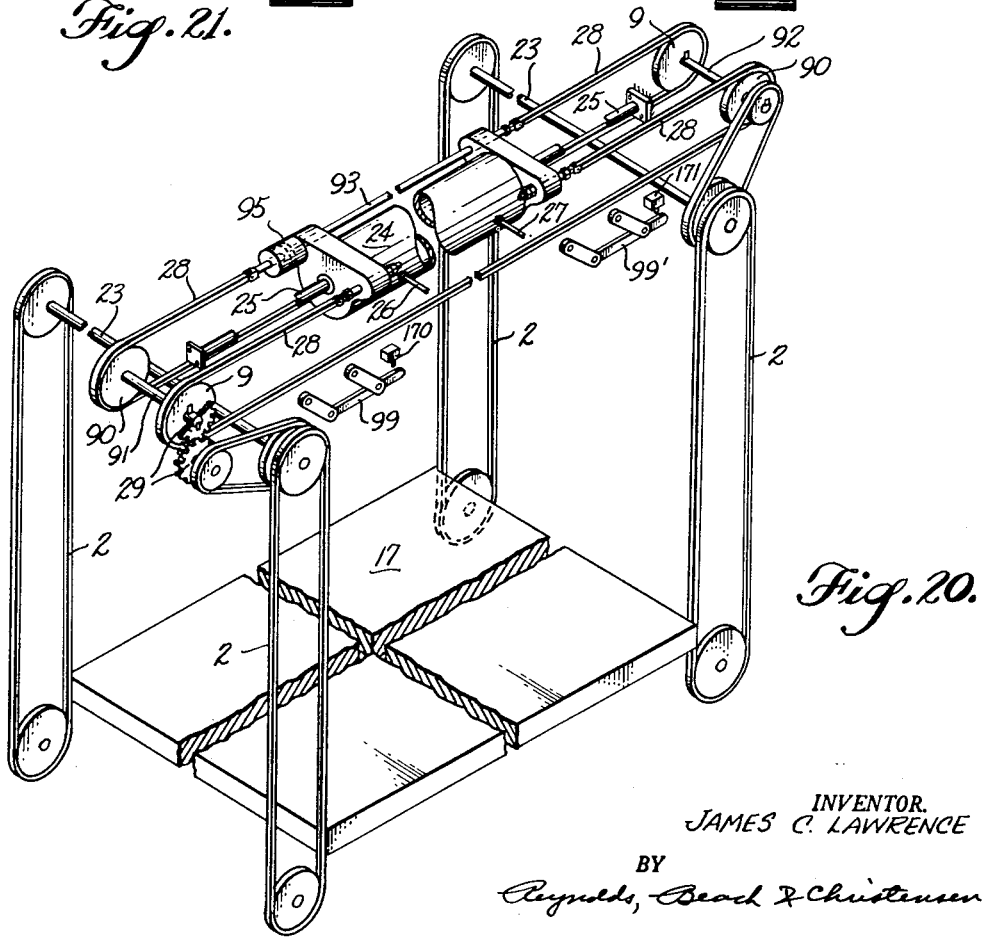

FIGURE 20 is a diagrammatic perspective view of elevator drive mechanism and FIGURE 21 is an enlarged detail view of its hydraulic cylinder components.

Figure 22:
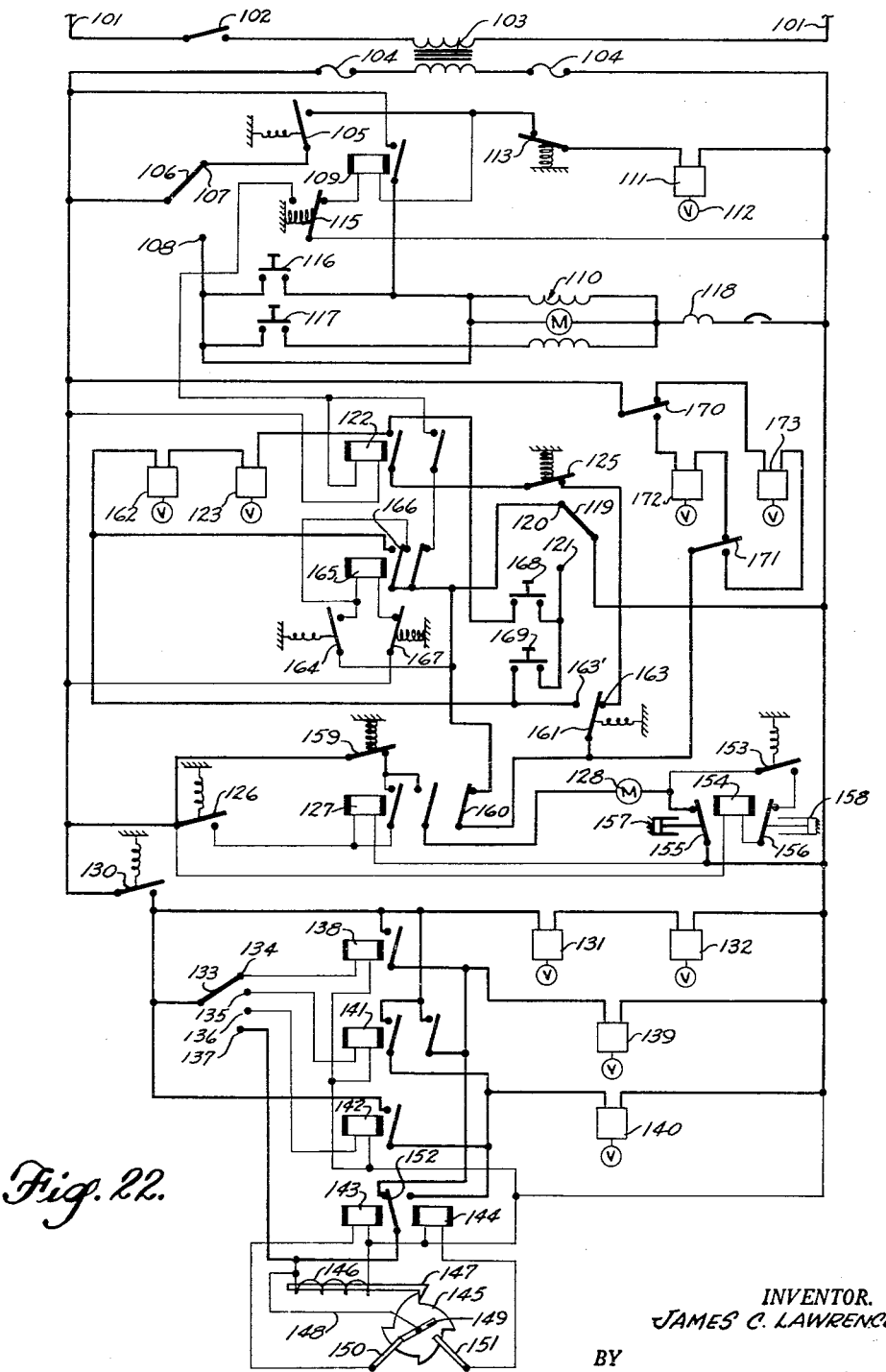

FIGURE 22 is a wiring diagram of the control system.

FIGURE 23 is a top perspective view of an alternative type of sheet squaring and feeding mechanism.

FIGURE 24 is a longitudinal sectional view through the sheet squaring and feeding mechanism of FIGURE 23, showing parts in one operative position, and FIGURE 25 is a similar view with parts in a different operative position and having parts broken away.

FIGURE 26 is an end elevation through such alternative mechanism taken on line 26—26 of FIGURE 24.

The general type of operation performed by the apparatus involves receiving edgewise a stack of panels piled in face-to-face contact, elevating such stack of panels until the upper panel has reached a predetermined feeding position, arresting upward movement of the stack at such location, sliding the uppermost panel edgewise off the top of the stack in a feeding operation, raising the stack through a further increment equal to the thickness of the panel discharged, sliding another panel off the top of the stack in a feeding operation, again raising the stack through an increment equal to the thickness of the panel discharged, repeating the single panel feeding and incremental stack raising operation until all the panels in the stack have thus been discharged one by one, and then receiving into the apparatus another stack of panels from which individual panels will be fed in like manner.

Figure 1:
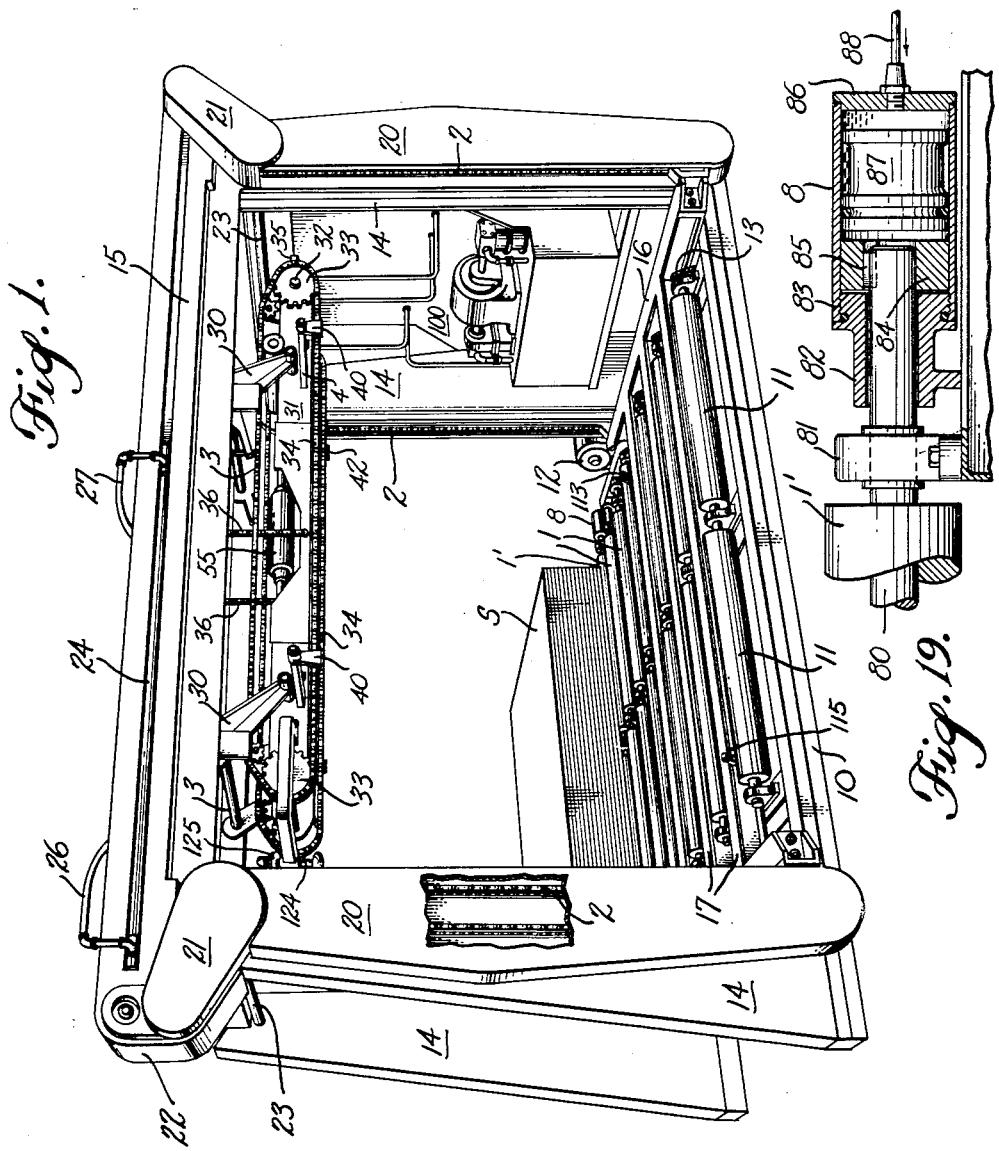
FIGURE 1 is a perspective view of the sheet feeder with parts broken away.

The feeding mechanism designed to accomplish this operation is shown generally in FIGURES 1 and 16. A stack of panels S, the panels of which are to be fed individually, is moved edgewise into the apparatus preferably on rolls 1 from a suitable conveyor which is not shown. These rolls are located alongside the frame 10 of the apparatus, which is of generally rectangular shape. Within such frame and coplanar with rolls 1 are rolls 11 of another roll set. The rolls 1 and 11 are driven all at the same speed by a motor 12 with a suitable gear reduction drive, so that the drive chain 13 interconnecting the rolls and powered by the motor 12 will move rather slowly. The machine frame includes four columns 14 located one at each corner of the lower portion of frame 10, and these columns carry a superstructure 15 bridging between the columns.

Within the frame is received an elevator including two parallel end members 16 and parallel bars 17 interconnecting such cross members 16 and spaced apart distances equal to the spacing of rolls 11 so that when the elevator platform is in its lower position the bars 17 are located in alternate arrangement with the rolls 11. Elevator hoisting chains 2 in housings 20, one at each corner of the frame alongside a column 14, are connected to the ends of the elevator platform bars 16 forming the corners of such platform. The hoisting chains 2 are driven by chain and sprocket mechanism within housings 21 at one side of the frame, and one of these chain drives in turn is driven by reversing gearing in housing 22. Movement of the hoisting chains 2 at one side of the frame is transmitted to the hoisting chains 2 at the other side of the frame by shafts 23 interconnecting the upper drive sprockets of these chains at opposite sides of the frame.

The drive for the hoisting mechanism in housings 21 connected to chains 2 must, of course, be reversible, and the vertical movement of chains 2 required is not great. Consequently, reversible drive of the hoisting chains may be effected conveniently by a member reciprocating horizontally in the superstructure 15 of the frame which will coordinate the drive at opposite ends of the elevator. Conveniently the reciprocating member may be an elongated cylinder 24 guided by and movable relative to a stationary piston on a rod 25 shown in FIGURE 21. Chains 28 may be secured to the opposite ends of this cylinder, to the gearing mechanism 29 in casing 22 and to the chain drive at the opposite end of the superstructure so that, as the cylinder 24 reciprocates, the shafts 23 will be rotated to move the chains 2. Reciprocation of such cylinder 24 on rod 25 is effected by supplying fluid under pressure, such as oil, through the connection 26 to the left end of the cylinder 24, as seen in FIGURE 1, for lowering the elevator. On the contrary, fluid under pressure can be supplied through connection 27 to shift the cylinder from the position shown in FIGURE 1 to that of FIGURE 18 to raise the elevator.

Within the frame structure bounded generally by columns 14 and suspended from the superstructure 15 is the individual sheet feeding mechanism. Such mechanism of the type shown in FIGURES 1 to 3 and 16 to 18 is supported from shafts 3 spanning the superstructure by parallel linkage arms 30 pivotally mounted by opposite ends of such shafts respectively. The swinging ends of arms 30 are interconnected by and carry bars 31 disposed in parallel arrangement, as shown best in FIGURES 2 and 3, on which the various components of the feeding mechanism are mounted. These bars will be elevated bodily and will move endwise slightly as the arms 30 swing about the axes of shafts 3.

In opposite ends of the bars 31 are mounted axles 32 carrying sprockets 33 about which extend two endless chains 34 arranged in parallel vertical planes. These chains are interconnected by sheet feeding pusher bars 35 shown best in FIGURES 2, 3, 16, 17 and 18. These chains extend lengthwise of the feeder frame a distance greater than the length of the longest panel to be fed by the apparatus, and in order to reduce as far as possible the dwell between the feeding of successive panels, it is preferred that two of such bars 35 be provided.

Figure 2:
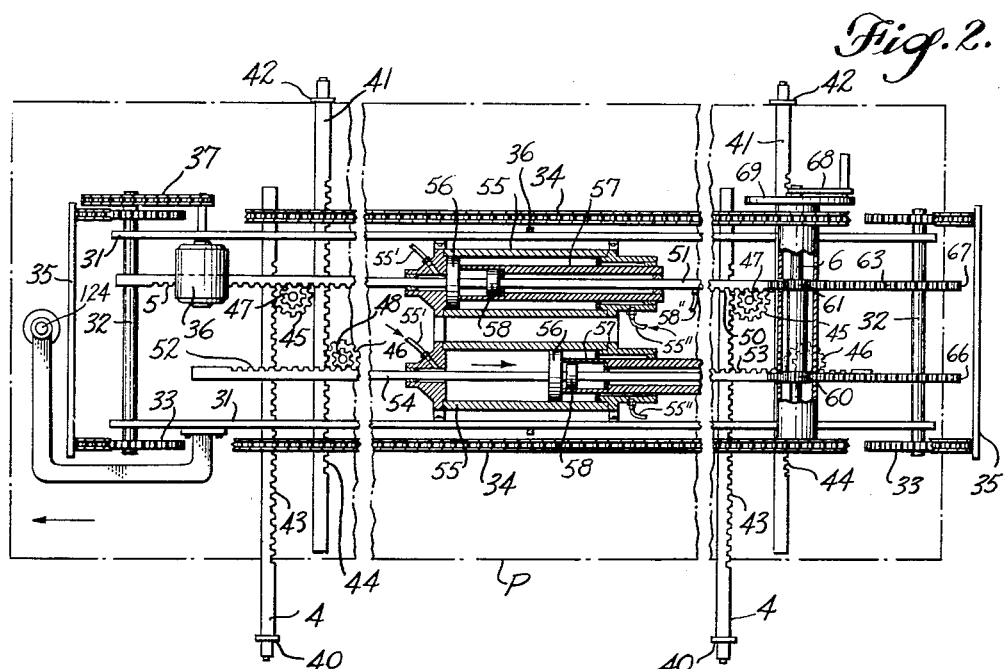
FIGURE 2 is a transverse sectional view through a portion of the sheet feeder taken on line 2—2 of FIGURE 17.
Figure 3:
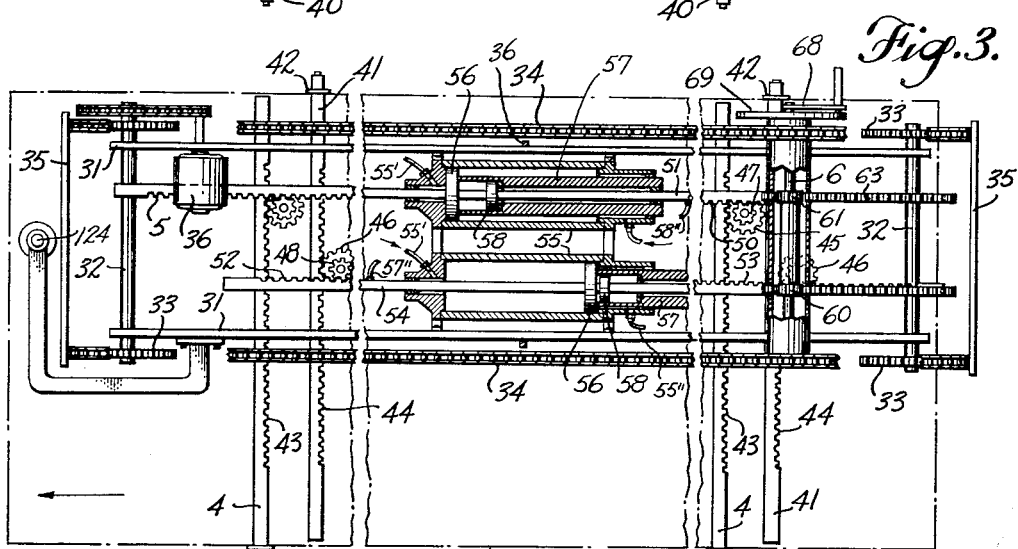
FIGURE 3 is a similar view showing parts in a different operative position.

In order that the feeder may be sufficiently versatile to be used for feeding machines operating at different speeds it is preferred that a variable speed drive be provided for the endless chains 34. Conveniently, such a variable speed drive may be effected by an oil motor 36 the speed of which can be varied simply by regulating the supply of oil to the motor. This motor, as shown in FIGURES 2 and 3, will drive chain and sprocket mechanism 37 to turn one of the shafts 32 carrying sprockets 33 with which the chains 34 are engaged. As these chains are driven the bars 35 will always move in the direction from right to left, as seen in FIGURES 1, 2 and 3, when carried by the lower stretches of the chains. Since bars 35 will not be thicker than the thinnest panel to be fed, such movement will cause each bar during such travel to slide only a single panel from the top of a stack on the elevator.

In feeding panels from the feeder to a machine such as a sander, it is usually important that the panel is located accurately transversely of the direction of feed. Also, it is important that the panel be square relative to such machine and the pusher bars 35. Before engagement of such a pusher bar with an edge of a panel, therefore, means are provided for squaring the position of the top panel irrespective of the orientation of the stack S of panels on the elevator. Such means include pairs of oppositely reciprocable squaring arms shown best in FIGURES 2, 3, 5 and 16. Each pair of such arms includes an arm 4 having a blade 40 engageable with one edge of the top panel on a stack and an opposite arm 41 carrying a blade 42 engageable with the opposite edge of the top panel.

Drive mechanism for the squaring arms 4 and 41 effects simultaneous reciprocation in opposite directions of both squaring arms in each pair. Such drive mechanism includes racks 43 and 44 on the squaring arms 4 and 41, respectively, with which mesh gears 45 and 46, respectively. Rotatably integral with each gear 45 is a gear 47 and rotatably integral with each gear 46 is a gear 48. Rotation of gears 45 and 46 will thus be effected by gears 47 and 48, respectively, and simultaneous rotation of these gears will effect simultaneous reciprocation of the squaring arms 4 and 41, because of the engagement of gears 45 and 46 with the racks 43 and 44. If the gears are rotated properly relative to each other, the squaring arms can be thus moved simultaneously toward each other, and if the gears are rotated oppositely, the squaring arms will be moved simultaneously to separate plates 40 and 42.

Since, in order to square a panel of any appreciable length, it is desirable to engage an edge at a plurality of spaced locations, the drive mechanism is arranged to move the two squaring arms 4 and the two squaring arms 41 shown in FIGURE 2, for example, simultaneously in the same direction and to the same extent. Actually, it would be possible to square the position of a panel simply by engaging one edge with a single squaring member and shifting the panel edgewise until its opposite edge engaged fixed locating stop means. Particularly for long panels, however, the squaring action can be effected more accurately and expeditiously by engaging one edge at a plurality of locations.

Also, while as mentioned above a panel might be located by pushing it edgewise into engagement with fixed locating stop means, it is frequently desirable to locate one panel in one edgewise position for feeding and the next panel in a different edgewise location for feeding. Moreover, it is ordinarily desirable to locate panels of different widths in different positions for feeding. With the present type of squaring apparatus engageable with opposite edges of a panel at a plurality of locations, it is possible to locate alternate panels in different positions and to accommodate and feed panels of different widths quite readily. In order to obtain such an operation, however, it is necessary that all of the squaring arms be driven conjointly and in related fashion.

To effect controlled reciprocation of the squaring arms 4 and 41, it is only necessary to coordinate the rotation of gears 47 and 48.

As shown in FIGURES 2 and 3, the gears 47 are driven conjointly because they mesh with the racks 5 and 50, respectively, of drive bar 51. Similarly, the gears 48 mesh respectively with racks 52 and 53 of drive rod 54. Reciprocation of drive rod 51 thus will effect simultaneous and equal reciprocation of squaring arms 4 in the same direction, and movement of drive rod 54 will effect simultaneous and equal movement of squaring arms in the same direction. It is therefore only necessary to coordinate the movement of drive rods 51 and 54 in order to establish the initial positions and spacing of the squaring plates 40 and 42 when open and their closed positions depending upon the width of the sheet to be squared and the location of such sheet desired relative to the machine to which the sheet is to be fed.

Figure 4:
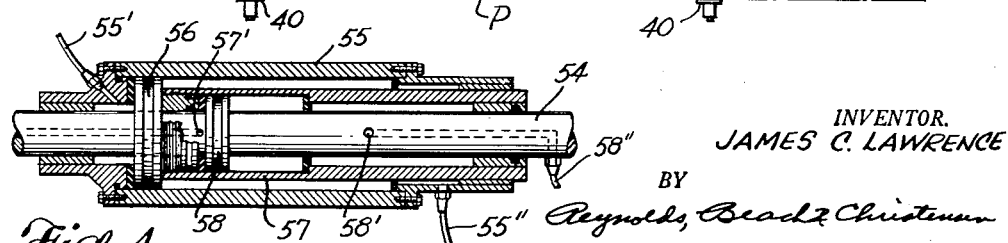
FIGURE 4 is a detail longitudinal sectional view through an operating cylinder shown in FIGURES 2 and 3.

The mechanism for reciprocating the drive rods is shown best in FIGURES 2, 3 and 4 as incorporating composite pistons and cylinders. Since the piston and cylinder mechanism is the same for each of the drive rods, as shown in FIGURE 4, only one of these need be described. Each composite actuator includes an outer cylinder 55 in which a piston 56 reciprocates. This piston carries an inner cylinder 57 and has an aperture through which the drive rod may move. The drive rod in turn has on it a smaller piston 58 which can reciprocate in the inner cylinder 57.

Fluid under pressure, such as air, is supplied to and exhausted from the outer cylinder 55 at one side of the piston 56 through a conduit 55′, and such fluid is supplied to and removed from the outer cylinder at the other side of the piston 56 through a second conduit 55″. Air or other fluid under pressure is supplied to the inner cylinder 57 at one side of piston 58 by an aperture 57′ communicating with a bore in the drive rod and a conduit 57″ connected to the bore. Fluid under pressure is supplied to and exhausted from the inner cylinder 57 at the opposite side of piston 58 through an aperature 58′, a bore in the drive rod and a conduit 58″ connected to it.

It will be appreciated that it would be very difficult to balance the pressures in the two cylinders 55 for the two drive rods 51 and 54 with precision, and similarly it would be difficult to balance exactly the pressures in the cylinders 57 for the two drive rods. Such pressures, therefore, cannot be relied upon to move the drive rods 51 and 54, and consequently the squaring arms 4 and 41, to predetermined sheet locating positions. For that reason positive stop mechanism cooperating with the drive rods 51 and 54 and operable to stop them positively in predetermined operative positions is provided.

Figure 5:
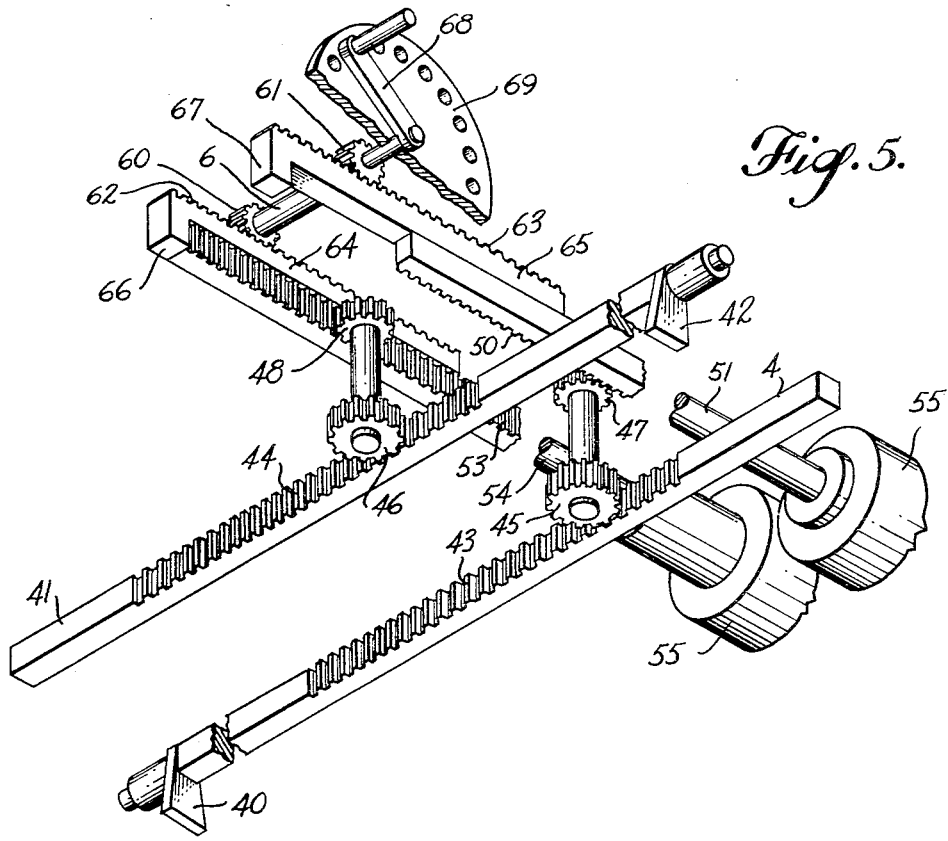
FIGURE 5 is a detailed bottom perspective view of the squaring arms and their drive mechanism at the right end of FIGURES 2 and 3.

The drive rod stop mechanism as best shown in FIGURE 5 includes a shaft 6 carrying pinions 60 and 61 which mesh respectively with the racks 62 and 63 on stop bars 64 and 65. These bars are suitably mounted alongside the respective paths of reciprocation of drive rods 51 and 54, in parallel, and such stop bars have hooked ends 66 and 67, respectively, which project into the paths of movement of their respective drive rods. When either of the drive rods strikes the hook of its stop bar, the movement of such drive rod will be interrupted, and the squaring plates 40 or 42 controlled by such drive rod will be positioned as positively as though such plates constituted stationary locating stop means. When the squaring plates are thus located, they do actually constitute fixed reference stop means, and for that particular operation serve the same function as stationary stop means.

In order to accommodate panels of different widths and in order to set the stop bars for locating the squaring bars 64 and 65 is provided. Such adjustment conjointly of the positions of both bars is effected by turning handle 68 to rotate shaft 6, which in turn moves the stop bars 64 and 65 simultaneously in the same direction and to the same extent. Such stop bars may be held in any adjusted position by providing a spring-pressed pin in the handle of crank 68, which will engage in any selected hole of the latch plate 69.

By suitable control mechanism fluid under pressure can be supplied to both of the inner cylinders 57 and to one only of the outer cylinders 55. By thus regulating the supply of fluid pressure to the cylinders and by setting the stop bars properly panels of any width within limits can be fed from the top of a stack successively along a single predetermined path, or panels fed from the top of the stack may be moved alternately along two offset paths. This latter type of operation frequently is desirable when the panels are fed to sanding machines to reduce the wear on the sanding rolls. FIGURES 6 to 15, inclusive, illustrate diagrammatically positions of the stop bars which would be established to handle feeding of panels of different widths, and either along a single path or alternately along offset paths.

Assuming that air under pressure is supplied to the right ends of both cylinders 57 and both cylinders 55 as seen in FIGURES 2 and 3, the squaring arms would be moved into and held in the fully extended positions shown in FIGURE 16. In this position it is assumed that the squaring plates 40 and 42 are spaced apart sixty inches. Because the gears 45 are twice as large as the gears 47 and the gears 46 are twice as large as the gears 48, the squaring arms 4 and 41 will be moved twice as far as the drive rods 51 and 54. Since it is desired to be able to feed with the feeder apparatus panels from twelve inches in width to forty-eight inches in width in increments of an inch, it is appropriate for the stroke of the pistons 58 in cylinders 57 to be three inches and the stroke of the pistons 56 in cylinders 55 to be nine inches.

A sanding machine, for example, receiving panels from the feeder described, normally would be able to accommodate panels forty-eight inches in width. If narrower panels are fed, it usually is desired to offset them first in one direction and then in the other transversely of their lengths, so that one edge or the other of each panel will be aligned with the location which the edge of a forty-eight inch panel would have occupied. Bearing in mind the maximum width opening of sixty inches of the squaring plates 40 and 42, the strokes of the large pistons 56 as being nine inches, the strokes of the small pistons 58 relative to their cylinders 57 as being three inches, and the movement of the squaring arms 4 and 41 being twice as great as the movement of the drive rods 51 and 54, the following table shows the relationship of piston movement to squaring plate positioning for panels of different widths centered or alternately offset as represented by the illustrations of FIGURES 16 and 6 to 15, respectively.

Figure 10:
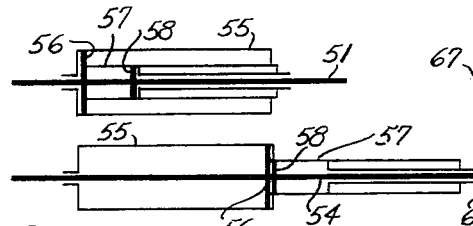
Figure 11:
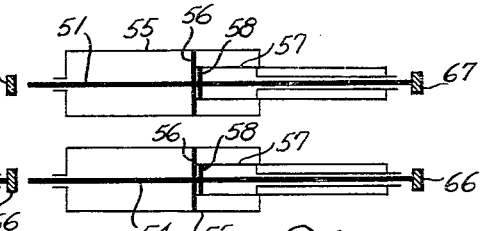

| Fig. | Panel Width | Position | Large Port Piston | Small Port Piston | Port Stops Shift | Large Strbd Piston | Small Strbd Piston | Strbd Stops Shift | Stop Spacing |
|---|---|---|---|---|---|---|---|---|---|
| 16 | 0″ | Open | 0″ | 0″ | 0″ | 0″ | 0″ | 0″ | 60″ |
| 6 | 48″ | Centered | 3″ | 0″ | 6″ | 0″ | 3″ | 6″ | 48″ |
| 7 | 48″ | do | 3″ | 0″ | 6″ | 3″ | 0″ | 6″ | 48″ |
| 8 | 42″ | Offset 6″ to Port | 6″ | 0″ | 12″ | 0″ | 3″ | 6″ | 42″ |
| 9 | 42″ | Centered | 4½″ | 0″ | 9″ | 4½″ | 0″ | 9″ | 42″ |
| 10 | 36″ | Offset 12″ to Port | 9″ | 0″ | 18″ | 0″ | 3″ | 6″ | 36″ |
| 11 | 36″ | Centered | 6″ | 0″ | 12″ | 6″ | 0″ | 12″ | 36″ |
| 12 | 30″ | Offset 18″ to Port | 9″ | 3″ | 24″ | 0″ | 3″ | 6″ | 30″ |
| 13 | 30″ | Centered | 7½″ | 0″ | 15″ | 7½″ | 0″ | 15″ | 30″ |
| 14 | 24″ | do | 9″ | 0″ | 18″ | 9″ | 0″ | 18″ | 24″ |
| 15 | 18″ | do | 9″ | 1½″ | 21″ | 9″ | 1½″ | 21″ | 18″ | plates either so that successive panels of a given width will be fed along the same path, or along alternately offset paths, mechanism for adjusting the positions of the stop While the representations of FIGURES 6 to 15 of the positioning of pistons 56 and 58 in cylinders 55 and 57 are very diagrammatic, the showing in FIGURES 2 and 3 is a much more structural representation of the mechanism illustrating the movement of the squaring arms which occurs in positioning for offset feeding a panel thirty-six inches in width and corresponding to the diagrammatic representation of FIGURE 10. In such offset squaring, as represented by this figure and by FIGURES 6, 8 and 12, fluid under pressure is supplied to the left end of one of the large cylinders 55 and to the right end of the other through connection 55", the opposite ends being vented. As illustrated in these figures and in FIGURES 2 and 3, such fluid under pressure is supplied to the left end of the port cylinder 55 and to the right end of the starboard cylinder 55 considered in relation to the direction of panel feed.

In FIGURE 2 air under pressure has been supplied to the left end of both small cylinders 57, the right ends being vented. Piston 58 of drive rod 51 has thus been moved fully to the right in its cylinder 57, while the large piston 56 is held fully in its position to the left. This has caused the squaring arms 4 to be moved inward six inches from their extended positions.

At the same time air under pressure supplied to the left end of the large port cylinder 55 is causing piston 56 to move to the right as seen in FIGURE 2, but although air also is supplied to the left end of the small port cylinder 57, port piston 58 is not moved to the right relative to its cylinder because of the faster movement of the larger piston, although it is immaterial whether the smaller piston moves relative to its cylinder under these circumstances. In any event, such movement of drive rod 54, effected by movement of piston 56 acting on cylinder 57, has drawn the squaring rods 41 inwardly a distance of twelve inches into engagement with the edge of the thirty-six inch wide panel P. As the port piston 56 continues to move from its position of FIGURE 2 to its position of FIGURE 3, the squaring plates 42, pulled by their bars, will drag the upper panel P from centered position into the position offset six inches from centered position which is shown in FIGURE 3.

Both the set of squaring plates 40 and the set of squaring plates 42 will be stopped in their positions of FIGURE 3. The squaring plates 40 will be stopped in the positions illustrated by bottoming of the starboard piston 56 at the left end of its cylinder and of the small starboard piston 58 at the right end of its cylinder 57. The positions of squaring plates 42 will be established by the engagement of drive rod 54 with the hook 66 of its stop bar 64. If it were not for such engagement, drive rod 54 would continue to move to the right beyond the position shown in FIGURE 3, because of the air pressure supplied to the left end of cylinder 57 tending to move piston 58 to the right in such cylinder. This piston will remain fully to the left in its cylinder, however, while piston 56 bottoms on the right end of its cylinder 55, because of the much larger surface area of piston 56 on which the air pressure is acting.

Figure 8:
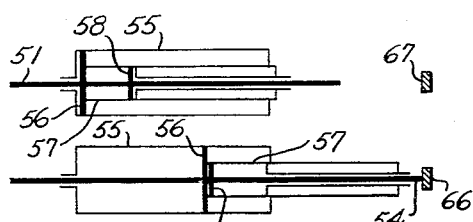
Figure 9:
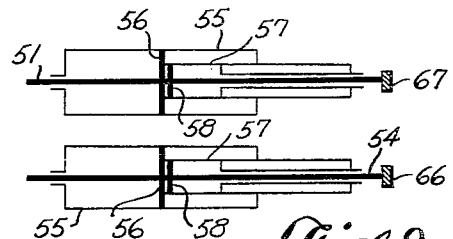
Figure 12:
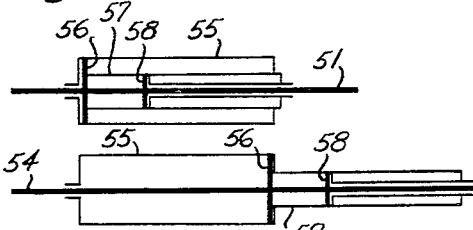
Figure 13:
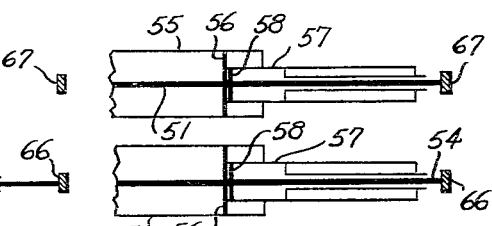
Figure 14:
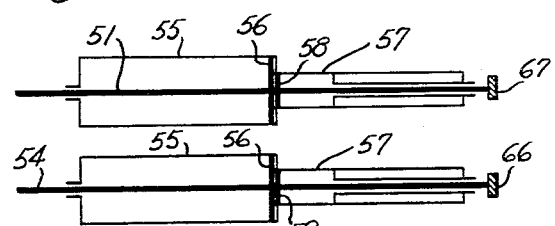

The position of hook 66 of stop bar 64 engaged by drive rod 54 is shown in FIGURE 10, and in a similar manner the stop mechanism is set by adjustment of handle 68 to interrupt movement of the drive rods in the proper positions for the width of the panels being fed and the type of feeding desired, i.e. whether centered or offset, in each instance. If the panels are to be fed in centered position, as illustrated by FIGURES 7, 9, 11 and 13, the hooks of the two stop bars will, of course, in all these instances be in alignment and abutted respectively by the ends of the drive rods.

Where a panel is to be offset to one side or the other from its central position, one drive rod will move farther than the other, as shown in FIGURES 8, 10 and 12, as described above. Adjustment of the stop bars will still be effected conjointly and to the same extent, as shown in these figures. Consequently, the positions of the hooks 66 and 67 will be set to be contacted by the one of the drive rods which moves farthest. The other drive rod will not be moved into engagement with its stop hook because fluid under pressure is not admitted to the left end of the larger cylinder 55.

When panels are to be fed in offset position, however, it is usually preferred that alternate panels be offset in opposite directions, although the offsetting could always be in the same direction. For one feeding operation, therefore, as shown in FIGURES 8, 10 and 12, air would be supplied to the left end of the large cylinder 55 for the drive rod 54 and to the right end of cylinder 55 for the drive rod 51, the opposite ends being vented, for the purpose of holding the starboard piston 56 fully to the left as seen in those figures. On the next operation fluid under pressure would be supplied to the left end of the large cylinder 55 for the drive rod 51, so that piston 56 for that drive rod would be moved while simultaneously fluid under pressure would be supplied to the right end of the large cylinder 55 for drive rod 54, thus preventing movement of the piston 56 for drive rod 54. In this instance, therefore, the drive rod 51 would engage its stop hook 67, whereas drive rod 54 would be moved only an amount equal to the stroke of piston 58 in its cylinder 57. On the next operation the supply of fluid under pressure would be reversed again so that drive rod 54 would make the longer stroke and drive rod 51 would be moved only a relatively short distance, as shown in FIGURES 8, 10 and 12.

After the top panel of the stack has been squared in the desired position for feeding, as described above, motor 36 driving chains 34 moves a pusher bar 35 into engagement with a panel end to feed the panel. Motor 36 will have been regulated so as to feed the panel off the stack as rapidly as the machine to which the panel is fed can accommodate it. In such feeding it is desirable that the bottom of the panel being fed be disposed in a predetermined position relative to the machine to which it is fed. The bottom of the panel being fed should, for example, usually be precisely level with the table of the machine to which the panel is being fed or just slightly above it. The upper surface of the top panel on the stack must, however, be below chains 34. Because the panels to be fed may range from one-quarter of an inch to two inches in thickness, it is desirable to make the position of the panel feed mechanism adjustable vertically to accommodate panels of different thicknesses.

As previously mentioned, the sheet feed mechanism bars 31 are mounted for vertical movement on the swinging ends of arms 30. To locate the bars 31 and the chains 34 at the proper elevation to accommodate panels of the thickness to be fed, therefore, it is only necessary to limit the downward movement of the bars 31 at the proper position. Downward movement of the bars is thus limited by chains 36 attached to the bars 31 preferably at their central portions, and extending upward over a supporting shaft 37 journaled on the upper portion of the frame superstructure 15. The rotative position of shaft 37 may be altered by turning shaft 38 which is connected by chain and sprocket mechanism to shaft 37. Shaft 38 is turned by movement of handle 39 connected to it, and this handle may have a latch pin engageable in holes of the plate 39' to hold the chains 6 at the desired elevation selected.

It will be evident that the chains 36 merely limit downward movement of bars 31. If the elevator should lift a stack of panels so that the upper panel engages and lifts chains 34 and these bars, the chains 36 will not prevent upward movement of the sheet feeding structure. Instead the arms 30 will simply be swung upward, and such movement will be cushioned by such upper panel assuming the weight of the superstructure. The arms 30 of one pair are formed as bell cranks having lateral extensions 7. To these extensions are connected tie members 70 extending into a casing 71 and secured to a piston fitted in the casing. Air under pressure may be supplied to the casing by a pipe 72, so that the weight of the superstructure on arms 30 will effect compression of the air by the force on it of the piston in the casing 71. The pressure of the air can be regulated with such a construction to balance the weight of the panel feed and squaring mechanism. Alternatively, a plunger in the casing may engage a compression type spring above it, or a combination of air and spring pressures could be utilized.

In order that there be as little delay as possible between the feeding of the last panel in a stack and the feeding of the first panel in the next stack, it is desirable to have a stack of panels supplied to a location adjacent to the feeder before all the panels have been fed from the next previous stack. Such a fresh stack to be fed is shown at the right of FIGURE 16 and in the background of FIGURE 1, which can be delivered by suitable conveying means to the location illustrated. This panel stack should not be permitted to move into registry with the elevator until it is in the position shown in FIGURES 1 and 16. It is desirable, therefore, to hold the stack in the position shown in FIGURES 1 and 16 until the elevator has descended fully.

The new stack of panels may be delivered to the position shown in FIGURE 1 or 16 by a gravity conveyor, or by an impositive surface friction conveyor, as may be desired. To insure that the stack does not progress closer to the elevator than the position shown, the idler roll 1', at the right of FIGURE 16 has brake means which ordinarily holds it against rotation and thereby deters further movement of the panel stack until such brake means are released and the rolls 1 driven positively. Brake means suitable for this purpose are shown generally in FIGURE 1 and in detail in FIGURE 19, as including a brake housing 8 located at the end of roll 1' on which the brake is effective.

The roll 1' with which the brake mechanism is associated is carried by a shaft 80 journaled in a pillow block 81. The end of this shaft projects beyond the pillow block and through the bore of a stationary mounting 82 to which the cylinder 8 is connected by threads 83. Within the cylinder is received an axially slidable collar 84 encircling the end of shaft 80 and connected to it for conjoint rotation by a key 85.

Between the collar 84 and the end 86 of cylinder 8 remote from the roll 1' is received a freely slidable piston 87. Fluid under pressure may be supplied to the cylinder between its end 86 and piston 87 through a conduit 88. Such fluid could be either a compressed gas, such as compressed air, or a liquid, such as oil under pressure. In either case the pressure of the fluid will force piston 87 to the left as seen in FIGURE 19, so that it will press collar 84 against the face of mounting 82. The surfaces of these parts may be of material which, when thus engaged, will have a high coefficient of friction. Shaft 80 will thus be effectively connected to the stationary mounting 82 and consequently will be held against rotation.

A principal purpose of the panel feeder described above is to feed individual panels from a stack in automatic fashion. Consequently, a control panel 100 incorporates suitable relays and controls shown diagrammatically in FIGURE 20 which are coordinated with appropriately located control switches to effect automatically the proper energization and deenergization of the various components of the feeder. In effecting automatic operation of the panel feeder, however, it is important that such feed operation be effected properly irrespective of variations in the height of panel stacks supplied to the feeder and irrespective of differences in height of various portions of such a stack.

A typical use of such a panel feeder is to feed the sheets edgewise one at a time to a sanding machine. Prior to such a sanding operation, therefore, the panels may be of nonuniform thickness and, if one end of each panel is thicker than the other and all of the thicker ends are in overlying registry and all of the thinner ends are in overlying registry, the height of one end of the stack may be appreciably more than the height of the other end of the stack. Under such circumstances it is not at all certain that the panel feed bars 35 shown in FIGURE 1, for example, would properly engage the edge of the uppermost panel, unless the top of the panel stack were leveled so that the uppermost panel would be parallel to the chains 34. Mechanism for effecting such operation is shown best in FIGURES 20 and 21.

Each of the chains 28 connected to the elevator drive cylinder 24 is shown as being looped around a sprocket 9 at one end and a sprocket 90 at the other end. One of these sprockets 9 is keyed to the shaft 91 carrying one of the gears 29, and the other sprocket 9 is keyed to the shaft 92 at the opposite end of the superstructure. The sprockets 9, therefore, are the driving elements for the shafts 91 and 92, and the sprockets 90 are merely idler or guide sprockets. If the chains 28 were fixedly connected to the cylinder 24 of the elevator drive mechanism, it will be evident that all of the chains 2 would be driven equally through the shafts 23 so that all portions of the elevator 17 would be raised equally. In order to compensate for possible differences in height of opposite ends of the stack, therefore, mechanism is provided to move the chains 2 at one end of the elevator relative to the chains at the opposite end for the purpose of tilting the elevator 17 to some extent.

While the opposite ends of one chain 28 are secured directly to the opposite heads of cylinder 24, the ends of the other chain may be connected to the opposite ends of a rod 93 adjustable lengthwise of this cylinder. Such rod is slidable through apertures 94 in the opposite cylinder heads of cylinder 24. In order that cylinder 24 may be effective to move the chain 28 in which rod 93 is connected, a thrust connection must be provided between such rod and the cylinder 24. Movement of rod 93 and its chain driving the chains 2 at one end of the elevator 17 relative to the other chain 28 and the chains 2 at the opposite end of the elevator 17 may be effected by making the thrust connection between the rod 93 and the cylinder 24 adjustable.

The adjustable thrust connection between rod 93 and cylinder 24 includes a small auxiliary cylinder 95 mounted directly on one of the heads of the cylinder 24. The rod 93 extends through this cylinder and has fixed to it a piston 96 fitted reciprocably in the cylinder 95 as shown in FIGURE 21. The length of the stroke of piston 96 in cylinder 95 determines the amount of relative movement which can be effected between the two chains 28, consequently between the chains 2 at the opposite ends of the elevator 17 and therefore the amount of tilt of which the elevator is capable for the purpose of leveling the uppermost panel of a stack.

Movement of piston 96 relative to cylinder 95 is effected by supply of fluid under pressure, such as oil, to one end or the other of the cylinder through connections 97 and 98, respectively. It is preferred that the relationship of chains 28 be established so that when the piston 96 is located centrally of the cylinder 95 as shown in FIGURE 1 the elevator platform 17 will be level. By supplying fluid under pressure through connection 97, therefore, to the left end of cylinder 95, as seen in FIGURES 20 and 21, the piston 96 will be moved to the right in such cylinder, so that the chains 2 at the right end of the elevator 17 as seen in FIGURES 1 and 20 will be raised to lift the corresponding end of the elevator. On the contrary, if fluid under pressure is supplied through connection 98 to the right end of cylinder 95, the piston 96 will be moved to the left, as seen in FIGURES 20 and 21, so that the chains 2 carrying the right end of the elevator 17 as seen in FIGURES 1 and 20 will be lowered, correspondingly lowering that end of the elevator.

It is preferred that supply of pressure fluid to one or the other of connections 97 and 98 be controlled automatically to effect a self-leveling operation of the top panel on a stack when the elevator has raised such panel substantially into edge-feeding position. To effect control in this manner, control elements 99 and 99' are located respectively at opposite ends of the panel superstructure which may be carried by a bar 31. Sensing element 99 may control supply of fluid under pressure to conduit 97 to effect raising of the right end of the elevator 17 so that the corresponding end of the uppermost panel will engage sensing element 99'. Conversely, sensing element 99' may control the supply of fluid under pressure to connection 98 so that, if this sensing element is engaged first by the top panel of a stack, rod 93 will be shifted by movement of piston 96 to lower the right end of the elevator 17 until the left end of the top panel engages the sensing element 99.

The location, function and operation of the various components of the automatic control mechanism can be correlated best in connection with a description of the feeder operation. It will be understood that various features of the electrical control mechanism may be varied in providing mechanism to produce a desired automatic operation of the apparatus. The electrical control mechanism will be operated by a power supply 101 which may have a voltage higher than necessary for the operation of the control mechanism. Such power supply is controlled by a master switch 102 and the voltage is reduced to the desired value by a transformer 103. Preferably the output side of the transformer is 110 volts and one or both of the legs of this circuit may incorporate fuses 104.

Assuming that the elevator has been emptied and has just descended to its lowermost position shown in FIGURE 1, the elevator frame will have engaged and closed normally open switch 105. It is assumed further that an automatic operation of the feeder is desired so that the switch 106 is in the position shown in FIGURE 22 in engagement with the automatic operation terminal 107, as distinguished from the manual operation terminal 108. Closing of the switch 105 effects energization of relay 109 controlling operation of the roll motor 110, which drives the rolls 1 and 11, and energization of the solenoid 111 which closes the normally open valve 112, preventing access of air under pressure through conduit 88 to the brake cylinder 8, thus releasing the brake of roll 1'.

As soon as the brake is released the action of gravity will move the new stack of panels shown in FIGURES 1 and 16, causing roll 1' to turn. Alternatively, the stack may be thus moved by an impositive conveyor on the feed side of roll 1'. When the leading edge of the stack of panels reaches the first roll 1, the stack will be moved on toward the elevator because such rolls will be kept moving by continued energization of the motor 110 through relay 109, still energized by the elevator holding switch 105 closed. To this time closed switch 105 has also maintained solenoid 111 energized to keep brake 8 released by holding valve 112 closed.

Shortly after the trailing edge of the stack of panels is moved off roll 1', the leading edge of the stack will engage normally closed switch 113 and open it. Since this switch is in series with switch 105 in the circuit of solenoid 111, such opening of switch 113 will reenergize solenoid 111, releasing valve 112 to move to its normally open position so that again air under pressure is admitted to the brake mechanism. The brake will thus be applied to roll 1' so that it will hold the next stack S of panels out of contact with the first roll 1 until the brake is released again. As the elevator is raised, switch 105 will be released to break the circuit to solenoid 111 before the stack of panels is raised off switch 113, allowing it to open again. The brake releasing solenoid 111 thus remains denergized to keep the brake applied until the elevator descends again with no panels on it.

When the stack of panels S has been moved by continued rotation of rolls 1 and 11 into a position above the elevator 17, the leading edge of the stack of panels will engage the arm of the double-pole switch 115 and move it from the position shown in FIGURE 20 to break the circuit of relay 109 into engagement with its other contact to initiate upward movement of the elevator. If the stack of panels is not in just the position desired, switch 106 may be moved to engage contact 108, whereupon by closing and holding switch 116 the panel stack may be moved still farther, or by closing switch 117 the motor driving rolls 1 and 11 may be reversed to withdraw the panel stack outward somewhat. For safety purposes an overload circuit breaker 118 may be incorporated in the circuit of roll motor 110.

Whether under automatic operation the switch 115 is moved to deenergize relay 109, or the switch 106 is swung from its automatic position to its hand-operated position and switches 116 and 117 are released after the stack S has been placed as desired, the final effect will be to locate the stack of panels over the elevator 16 with the rolls 11 stopped so that the panel stack will stay in such position. Thereafter, the elevator 16 will be raised to lift the stack of panels from the rolls 11, and again the elevator may be controlled either automatically by placing switch 119 in engagement with contact 120, as shown in FIGURE 20, or manually by moving such switch into engagement with contact 121.

If the operation is to be of automatic character, switch 115 engaged with its left contact in FIGURE 22 by the stack of panels engaged with it, opposite to its normal position, will energize relay 122 to effect energization of the solenoid of solenoid valve 123, which will open conduit 27 for supplying fluid under pressure to the right end of cylinder 24, as seen in FIGURES 1 and 20, while venting the conduit 26. Even though switch 115 should be closed only momentarily, relay 122 will remain energized through its holding circuit so that the upward movement of the elevator will be continued until the upper panel of the stack S engages and lifts the sensing element 124. Upward movement of such sensing elements will effect opening of switch 125, normally closed, to interrupt the circuit through the solenoid valve 123. Relay 122 will, however, remain energized, even when switch 125 is opened.

As the sensing element 124 is moved upward, not only is upward movement of the elevator interrupted by opening of switch 125, but the sensing element also closes switch 126 to energize relay 127. Energization of such relay initiates operation of motor 128 which drives the chains 34 carrying the feed bars 35 engageable with the end of the top sheet on the stack S to be fed from the feeder. Relay 127 also is provided with a holding circuit so that this relay will continue to be energized even after switch 126 is opened. Motor 128 may be an electrically controlled fluid motor.

A further action effected by raising of the sensing element 124 by the top sheet of the stack is the closing of switch 130 which initiates the squaring operation effected by movement of the squaring arms 4 and 41. The three operations of termination of the elevator raising movement by opening of switch 125, starting of the feed motor by closing of switch 126, and initiation of the squaring arm movement by closing of switch 130 all occur substantially simultaneously.

Closing of switch 130 to initiate the squaring arm movement will always energize the solenoids of valves 131 and 132 controlling the flow of fluid under pressure to the left ends of the starboard and port smaller cylinders 57 through conduits 57". In addition, closing of this switch will admit fluid under pressure to one end or the other of the large squaring arm operating cylinders depending upon the particular type of desired squaring operation selected in advance by the operator.

In order to select the type of squaring operation desired, a selector switch 133 is provided which can be set to engage any one of the contacts 134, 135, 136 and 137. If, as shown in FIGURE 20, the switch arm 133 is in contact with switch point 134 when the squaring switch 130 is closed, relay 138 will be energized, which in turn will energize the solenoid of valve 139. This valve normally would be in a position such that fluid under pressure would be supplied to the right end of the large port cylinder 55 so as to hold its piston 56 fully to the left as seen in FIGURES 2 and 3. Upon energization of this solenoid, however, the valve would be moved to supply fluid under pressure through conduit 55' to the left end of the large port cylinder, so that the piston 56 would be moved to the right in the manner shown in FIGURES 2 and 3 until the end of squaring rod 54 engages its stop hook 66 as shown in FIGURE 5. The solenoid of the other valve 140 would remain deenergized so that its valve would continue to supply fluid under pressure to the right end of the large starboard cylinder 55.

Because only the small starboard piston 58 has moved, the squaring arms 4 will always be shifted to locate the plates 40 in a predetermined position, as shown in FIGURES 2 and 3, irrespective of the degree of movement of the large port piston 56 alone, or, in addition, the movement of the small port piston. Whatever the width of the panel being squared, therefore, plates 42 on squaring arms 41 will shift the panel until its opposite edge is engaged with the plates 40 to locate such opposite edge relative to the machine to which the panel is fed.

If the switch arm 133 were in contact with the switch point 135, relay 141 would be energized, which would effect energization of the solenoids of both valves 139 and 140, so that air under pressure would be supplied to the left ends of both large cylinders 55 through the conduits 55'. With such setting of the valves both large pistons would move to the right as shown in FIGURES 7, 9, 11, 13, 14 and 15, until their respective rods 51 and 54 had engaged their respective stop hooks 66 and 67. In each instance, therefore, the panel to be fed would be squared in a central position.

If the selector switch 133 were placed in contact with the switch point 136, closing of squaring switch 130 would energize relay 142. Such energization would cause energization of the solenoid of only valve 140, so that, opposite to the illustration of FIGURES 6, 8, 10 and 12, air under pressure would be admitted to the left end of only the starboard cylinder 55, causing its piston 56 to move while the piston 56 of the port large cylinder would be held to the extreme left end of its cylinder. Consequently, upon each feeding operation the top panel would be squared in an offset position, always toward the starboard side of the feeder. Irrespective of the width of the panel being fed, the location of the starboard edge will always be the same, established by the location of plates 42.

If the selector switch arm 133 is in engagement with switch point 137, closing of switch 130 will energize one or the other of relays 143 and 144, depending upon the rotative position of stepping switch wheel 145. Each time the switch 130 is closed when the selector switch arm is in such position, the solenoid 146 of such stepping switch wheel will be energized to reciprocate the ratchet arm 147 to turn the switch wheel 145 one tooth. Current is supplied by a lead 148 to the center of this wheel, which carries the distributor strip 149. When in the position shown in FIGURE 20, the strip 149 would energize the brush 150 for transmitting current to relay 143. The next time that switch 130 is closed when switch arm 133 is in engagement with switch point 137 the ratchet mechanism 146, 147 would turn the switch wheel 145 through a quarter-turn, so that the strip 149 would be engaged by the brush 151, which is connected to relay 144. Immediately, therefore, this relay would be energized to swing the relay contact arm 152 toward the coil of relay 144.

The switch point adjacent to relay coil 143, which is engaged by the relay switch arm 152, is connected to the solenoid of valve 139 controlling the supply of fluid under pressure for shifting the large port piston 56 to the right as seen in FIGURES 2 and 3. The switch point adjacent to relay coil 144 engageable by relay switch arm 152, on the contrary, is in circuit with the solenoid of valve 140, which controls the supply of fluid under pressure to move large piston 56 of the starboard cylinder to the right. It will be evident, therefore, that as long as selector switch arm 133 is in engagement with switch point 137 the rotary switch 145 will energize brush 150 and relay 143 in one instance and brush 151 and relay 144 in the other instance, alternately. Switch arm 152 by such relay energization will be swung from its position to energize the solenoid of valve 139 to its position to energize the solenoid of valve 140 and back again alternately.

With the stops 66 and 67 for the squaring rods 54 and 51, respectively, set in one of the positions shown in FIGURES 8, 10 and 12, for example, it will be evident that one squaring rod will engage its stop and then the other squaring rod will engage its stop in alternate operations. Consequently, panels fed by the feeding apparatus will be squared in offset positions, one sheet being offset to one side, and the next sheet being offset in the opposite side, alternately in successive operations. In each instance, of course, with whatever switch terminal the switch arm may be engaged, closing of squaring switch 130 will cause the solenoids of both valves 131 and 132 controlling supply of fluid to both smaller cylinders 57 to be operated for supplying fluid under pressure to the left ends of such cylinders. The pistons 58 will not always move in their cylinders, however, for the reasons discussed in connection with the operation of the mechanism as portrayed in FIGURES 8, 10 and 12.

The squaring arms 4 and 41 will remain in their inward squaring positions throughout the operation of feeding the top panel from the stack, because the top panel being fed will hold the sensing member 124 in its upper position until after the panel has been fed out from under such sensing member, as shown in FIGURE 17. As the sensing member drops downward, the switch 130 will open, which will deenergize all of the solenoids of valves 131, 132, 139 and 140, which may have been energized, causing all the valves to be positioned for supplying air under pressure to the right ends of both the large cylinders 55 and the small cylinders 57. Consequently, both pistons 56 and both pistons 58 will be held fully to the left in their positions shown in FIGURE 4. The squaring arms will thereby be shifted outward to their position of greatest spacing.

Considerably before the panel reaches its position shown in FIGURE 17 the panel P will have been gripped by the machine to which it is being fed so that it will be pulled the remainder of the distance off the stack of panels S without reliance upon the pushing action of a feed bar 35. In fact, if the feed bar continued to be engaged with the panel end during its movement by chains 34 around the arcs of sprockets 33 adjacent to the discharge end of the feeding mechanism, the bar 35 would scrape transversely of the panel edge, which might deface such edge or catch and tend to raise the trailing edge of the panel, which would be undesirable. Consequently, control mechanism is provided for interrupting the operation of the feed motor 128 briefly when the feeding bar 35 approaches the sprockets 33 adjacent to the discharge end of the feeding apparatus to enable the panel pulling mechanism to move the panel's trailing edge out of proximity to the bar 35, so that no contact of the bar with the panel can occur as such bar is moved upward around the sprockets 33 adjacent to the discharge end of the apparatus by the chains 34.

The control mechanism provided to interrupt operation of feed motor 128 briefly for the purpose discussed includes the switch 153, which would be located conveniently to be closed by movement of a bar 35. Closing of such switch will energize relay 154 to attract simultaneously its switch arms 155 and 156. Such movement of switch arm 155 immediately will break the circuit to the feed motor 128 so that it will stop but without deenergizing the principal control relay 127 for this motor, which will remain energized because of its holding circuit. The simultaneous movement of switch arm 156 will effect immediate deenergization of relay 154 so that the switch arms 155 and 156 will tend to return to their relay- deenergizied positions. Associated with the switch arm 155, however, is a dashpot 157 which will delay reclosing of this switch sufficiently so that the panel P may be removed to withdraw its trailing edge out of the upwardly moving path of the pusher bar 35.

When switch arm 155 recloses following deenergization of relay 154, the feed motor 128 will be reenergized immediately because of the continued energization of relay 127. Despite the fact that switch 153 remains closed until after the chains 34 have been moved through an appreciable distance after switch 155 has again closed, relay 154 will not be reenergized immediately because its switch arm 156 in its circuit is also provided with a dashpot 158. This dashpot is shown as being longer or in some way slower acting than dashpot 157, so that reclosing of switch 156 will be delayed until switch 155 has reclosed and the chains 34 have been moved far enough to enable switch 153 to open. Relay 154 will therefore not be reenergized until switch 153 has been closed again, which will be on the next panel feeding cycle.

When thus reenergized by reclosing of switch 155, the feed motor 128 will continue to operate until the pusher bars 35 have almost reached positions at the extreme ends of the paths of chains 34. At this time the pusher bars or chains will move switch 159 to open position, which will break the circuit of motor 128 and the holding circuit of relay 127 so that both will be deenergized. The chains 34 will therefore stop after coasting sufficiently to place the pusher bars 35 approximately in their extreme positions shown in FIGURE 17.

It will be appraciated that the panel P may have moved to the position shown in FIGURE 17 so that the sensing member 124 has dropped onto the top of the next panel P in the stack S before the chains 34 have completed their movement into the position shown in that figure. Nevertheless, because of the holding circuit of relay 127, such feeding operation will be completed even though switch 126 has been released and has been moved to open position by dropping of the sensing member. Also, because of the downward movement of the sensing member, the squaring arm control switch 130 may have opened to deenergize the solenoids of the various valves 131, 132, 139 and 140 to effect retraction of the squaring arms into the position shown in FIGURE 16. In that event switch 125 also will have been released to close, which, because of the continued energization of relay 122 through its holding circuit, would tend to reenergize the solenoid of valve 123 and cause the elevator 16 to be moved upward by supplying fluid under pressure to the right end of cylinder 24 through conduit 27.

Despite the closing of switch 125, however, upward movement of the elevator will not occur until after the chains 34 have completed their movement to their initial positions with the cross bars 35 at the extreme ends as shown in FIGURE 17. By this time, of course, switch 130 will have been released so that the squaring arms have been retracted. Such sequence of operation is insured by the provision of switch arm 160 under the control of relay 127. This switch, which is normally closed, is in series with switch 125 under the control of the sensing element 124 and cannot return to closed position until relay 127 has been deenergized, which is effected by opening of switch 159. Consequently, even though switch 125 has been closed, relay 127 must have been deenergized at the completion of travel of chains 34 before upward movement of the elevator is resumed. As soon as the elevator has moved upward the thickness of one panel, switch 125 will be opened again to interrupt its movement, and switch 126 will have been closed again to energize relay 127 and open switch 160, so that the next feed operation of chains 34 will be initiated and the elevator again will remain quiescent until the conclusion of such feed chain cycle.

It is possible that some unusual circumstance may occur, so that the sensing element 124 is not raised as the elevator moves upward to open switch 125 and close switch 126 to open switch 160. In that case the elevator would continue to move upward and cause damage to the machine if a safety switch were not provided. Thus, for example, a stick might be incorporated in a stack of panels which would engage between the upper panel and a chain 34 or bar 31 to raise the feeding mechanism supported on arms 30 without the sensing element being lifted relative to such arms. For such event an upper safety limit switch 161 is provided which would be actuated by excessive swinging movement of an arm 30 or excessive upward movement of a bar 31, for example. Such safety switch is arranged in circuit with both elevator raising solenoid 123 and elevator lowering solenoid 162. As long as switch 161 is in engagement with its contact 163 and switch 125 is closed, solenoid 123 will remain energized to continue upward movement of the elevator. Upon actuation of switch 161 to disengage its terminal 163 and engage its terminal 163', however, the circuit to solenoid 123 would be broken and instead a circuit would be completed to the elevator lowering valve solenoit 162 controlling supply of liquid under pressure to conduit 26 supplying the left end of cylinder 24, as seen in FIGURE 1. At the same time supply of fluid under pressure to conduit 27 would be discontinued. Consequently, the elevator immediately would move down and such downward movement would continue until switch 161 had been released, whereupon it would be reengaged wtih its terminal 163. If the difficulty had been remedied by that time, switch 125 would be actuated to terminate the upward movement of the elevator, but otherwise if the elevator were raised sufficiently again to move switch 161 out of contact with its terminal 163 and into contact with its terminal 163', the upward movement of the elevator again would be arrested by the actuation of this switch, and it would be moved downward. Such short up and down hunting movement of the elevator would continue until the cause of such upward overtravel of the elevator had been removed.

When operating normally switch 125 would be closed and opened alternately to effect raising movement of the elevator 16 by increments equal to the thickness of panels on the stack S until the last panel had been fed from the elevator. At that time, instead of the sensing element 124 being supported in the intermediate position shown in FIGURE 17 by the next panel to be fed, it would have dropped downward into the position shown in FIGURE 1 to close switch 164. Closing of such switch energizes relay 165, which breaks the holding circuit of elevator raising relay 122 and, by closing switch 166, energizes the solenoid 162 of the elevator lowering valve to supply fluid under pressure to conduit 26, while interrupting supply of such fluid to conduit 27. Such supply of fluid will effect movement of cylinder 24 to the left, which drives chains 2 to lower the elevator 16, 17 into the position shown in FIGURE 1. When the elevator reaches this position, normally closed switch 167 will be opened to deenergize relay 165 for interrupting downward movement of the elevator.

As also explained previously, assuming that another stack of panels S is in the position shown in FIGURES 1 and 16 to be fed to the elevator, the closing of switch 105 would have initiated movement of such stack of panels toward the elevator. In the absence of interference by the operator such stack of panels will be fed automatically to the elevator, whereupon the elevator automatically will be raised until the top panel of the new stack again reaches the feeding position. Thereupon automatic feeding of the panels from that stack will be effected in the manner described.

In some instances it may be desirable to lower the elevator before all the panels have been fed from the stack on it. Alternatively it may be desired to raise or lower the elevator at will for some reason. For that purpose switch 119 may be swung from engagement with switch point 120 into engagement with switch point 121, and when it is in the latter position the elevator control relays 122 and 165 cannot be energized. The solenoid of valve 23 can, however, be energized at will to effect raising of the elevator by closing of manual switch 168. Preferably this switch is of the momentary contact type, so that as soon as the operator's hand is removed from it it will open automatically and terminate upward movement of the elevator. Conversely, the elevator may be moved down at will be closing of manual switch 169 to energize the solenoid valve 162. Again, this switch should be of the momentary contact type, so that as soon as it is released by the operator it will open.

In case of emergency, of course, the master switch 102 can be pulled, whereupon all of the drive mechanisms will be deenergized and movement of all parts of the feeder will stop.

As has been discussed previously, it may be desirable to incorporate in the mechanism an arrangement to modify the action of the main elevator hoisting drive by tilting the elevator somewhat to compensate for difference in thickness of a stack of panels at its opposite ends. The auxiliary adjusting mechanism to move relatively the chains 2 at opposite ends of the elevator has been described mechanically in connection with FIGURES 20 and 21. The sensing elements 99 and 99' at opposite ends of the elevator, which would be engaged by the opposite ends of the top panel on a stack, are arranged to control respectively switches 170 and 171. These switches can energize respectively solenoids 172 and 173 of valves to control the supply of fluid under pressure to conduits 97 and 98 connected to the left and right ends, respectively, of auxiliary cylinder 95.

As the elevator is raised, if switch 170 is engaged first, indicating that the left end of the stack of panels as seen in FIGURE 20 is higher, liquid would be supplied to the conduit 97 by the valve actuated by energization of solenoid 172 corresponding to switch 170. The valve controlled by solenoid 173, which is not energized, would be positioned to connect conduit 98 communicating with the right end of cylinder 95 to a hydraulic liquid return conduit. Consequently, the piston 96 would move to the right, as seen in FIGURES 20 and 21, to raise the right end of the elevator more than the left end. As soon as the right end of the top panel engaged the sensing parallelogram 99', its normally closed upper contact would be broken, thereby deenergizing the valve controlled by solenoid 172 so that no more pressure fluid would be supplied through conduit 97 to the left end of cylinder 95. While movement of the switch arm into engagement with the opposite contact would seek to energize solenoid 173 for supplying fluid under pressure to the right end of auxiliary cylinder 95, such solenoid would not be energized because its circuit would be broken by switch 170. This switch also has a contact which would be closed in the circuit of solenoid 173 when the sensing parallelogram 99 is not engaged by the top panel of a stack. With both of the sensing parallelograms 99 and 99' engaged, however, both solenoids 172 and 173 would be deenergized so that the piston 96 would not be shifted additionally in its cylinder 95.

Piston 96 would therefore remain stationary relative to its cylinder 95, despite continued movement of cylinder 24 relative to the stationary rod 25 until the stack of panels had been raised sufficiently to open either switch 125 or to move switch 161 out of engagement with its contact 163. In either event solenoid 123 would be deenergized to cut off the supply of fluid under pressure to cylinder 24 so that upward movement of the elevator would be terminated. While the movement of piston 96 in its cylinder 95 normally will occur during continued upward movement of the elevator effected by the cylinder 24, it is important that the leveling adjustment effected by piston 96, as well as the upward movement of the elevator, be interrupted if movement of the feed bars 35 should begin. The current supply to the solenoids 172 and 173, therefore, like that to the solenoid 123 controlling the upward movement of the elevator effected by cylinder 24, is through the switch 160 of relay 127. If this relay should be energized to open this switch, the circuit including solenoids 172 and 173 would be deenergized simultaneously.

As has been described previously, the next operation is for the feed mechanism to slide off the stack the top panel, which has been squared and shifted, if necessary, into proper alignment with the predetermined feed path. Pressure fluid is not admitted again to either conduit 97 or 98, however, to shift piston 96 relative to its cylinder 95 until solenoid 123 has again been energized to index the elevator upward a distance equal to the thickness of the new top panel on the stack. Thereupon one or the other of switches 170 and 171 will be moved first, and then both together, as may be required to level the new top panel.

While, because of cumulative variation in thickness of the panels in a stack, the movement of piston 96 relative to cylinder 95 might be considerable when the switches 170 and 171 are actuated by the first top panel of a new stack, the piston 96 by actuation of such switches will be returned gradually toward its central position in cylinder 95 by increments as the height of the panel stack decreases because successive panels are removed from it. When the last panel in the stack is leveled by movement of piston 96 relative to cylinder 95, therefore, the piston will be approximately in its central position, so that the elevator will be sufficiently level to receive the next stack of panels when it has descended to its bottom position. The arms 99 and 99' of the parallel linkage sensing devices will be long enough so as to be engaged by the opposite ends of the top panel of a stack in each instance whether such panel be long or short within the range of panel lengths intended to be fed by the sheet feeder.

In the modification shown in FIGURES 23 to 26, inclusive, the lower portion of the sheet feeder will be similar to that shown in FIGURES 1 and 16 as described above. The frame will include the posts or columns 14 and the upper horizontal frame members 15' connecting the upper ends of posts at opposite ends of the machine. A load of sheets to be fed will be loaded upon the platform 17 as previously described and will be raised by suitable hoist mechanism, as discussed, into a position for feeding the sheets edgewise one at a time from the top of the stack. The sensing element 124' will be engaged by the upper sheet of the stack as it is lifted by platform 17 when such upper sheet approaches the edge feeding elevation, and lifting of such sensing member by upward movement of the stack will initiate operation of the edge feeding mechanism.

The principal difference in the machine shown in FIGURES 23 to 26, inclusive, is the type of edge feeding mechanism utilized. Instead of effecting edgewise movement of the top sheet by a pusher bar engaging the trailing end of the sheet, the feeder mechanism of FIGURES 23 to 26, inclusive, has mechanism to grip the edges of the sheet extending parallel to the direction in which the sheet is to be fed and such mechanism is then moved bodily in the feed direction simultaneously to move the sheet in the direction of feed. With such mechanism, it is immaterial how long in the direction of feed movement the sheets may be or what their positions lengthwise of the feed direction may be within wide limits. It is even entirely practical to feed sheets of random length piled in a single stack as long as the sheets in such stack are all of the same width and are stacked widthwise in registry and with their leading ends also approximately in registry. With this type of edgewise feeding mechanism, as well as with that previously described, the sheets may be fed in centered position, in offset position or alternately in oppositely offset positions as previously described.

The primary mechanism for actuating the sheet edge engaging members includes the racks 4 and 41 which are driven by the drive rods 51 and 54 actuated by the pistons in cylinders 55, as has been explained in detail in connection with FIGURES 5 to 15, inclusive. The type of sheet movement effected transversely of its direction of movement will be established by setting the regulating handle relative to latch plate 69. When the sheet on top of the stack of sheets has been located in the desired position transversely of its length, it is fed lengthwise to the left as seen in FIGURES 23, 24 and 25.

The previously described type of mechanism was designed to push the sheet through a distance at least nearly equal to its length, whereas the mechanism of FIGURES 23 to 26, inclusive, need only move the sheet endwise sufficiently so that its leading end will be engaged between and gripped by the pinch rolls 180 and 181. From that position the sheet will be moved lengthwise over the remainder of its length, whatever that may be, by rotation of such pinch rolls. The upper roll 181 is driven for that purpose by a belt 182 and motor 183.

While it is preferred that the pinch rolls 180 and 181, or at least one of them, have a resilient surface so as to grip the sheet firmly and accommodate sheets varying in thickness to some extent, it is preferred that the spacing of the roll axes be adjustable to accommodate sheets of considerably different thicknesses. While the lower rolls 180 may be mounted to rotate about a stationary axis, the upper roll 181 may be suspended by rods 184 carrying bearings supporting the opposite ends of the roll axle respectively. The upper ends of these rods are mounted on crank pins 185 of crank disks 185' which are mounted on opposite ends of the shaft 186. This shaft can be turned by the belt 186' driven by the thickness-adjusting arm 187 which may be secured in any of various adjusted positions by engaging a spring pin in its handle with an appropriate latch hole in the latch plate 188. Vertical movement of the axis of roll 181 effected by this adjusting mechanism is assured by providing blocks 181' on opposite ends of the roll axle which are slidably guided in vertical ways 189.

The mechanism for shifting the top sheet of the stack lengthwise into engagement with the pinch rolls 180 and 181 is supported on the frame 190 which is suspended by plates 191 from rollers 192 which run on stationary tracks 193. These tracks are supported by hangers 194 from spaced cross beams 195, which, in turn, are suspended by plates 196 from the longitudinal beams 15'. To assure that the carriage composed of the frame 190 and its associated parts will be held in proper vertical position as it is guided for reciprocation by the tracks 193 and will not become derailed, it is preferred that backing rollers 197 also mounted on plates 191 be provided which will bear upon or at least lie closely beneath the lower edges of the tracks 193. Engagement of such rollers with the track bottoms will prevent appreciable upward movement of the sheet clamping carriage.

In order to effect movement of the upper sheet of the stack to the pinch rolls 180 and 181 by reciprocation of the carriage including the frame 190 and its associated parts guided by the tracks 193, such carriage includes sheet edge clamping mechanism. Such clamping mechanism is supported principally by the side bars 200 which are secured to the ends of the racks 4 and 41, respectively, in parallel relationship. The actual contact with the sheet edges is effected by blocks 201, which are supported by plates 202 movable vertically relative to the side bars 200. Guiding such movement each plate 202 has in it an upright slot 203 through which extends the shank of a pin 204 having on it a head engageable with the face of the plate 202 so as to maintain it in position close along side the adjacent side bar 200. The weight of the sheet edge engaging blocks 201 is supported by chains 205 enabling such blocks to move upward but limiting their downward movement.

The upper ends of chains 205 are secured to rods 206 extending along opposite sides of the reciprocating carriage and secured to the main frame by bars 207 which may be of angle cross section. The blocks 201 are guided for movement transversely of the longitudinal sheet edges and direction of sheet feed by sliding engagement of such blocks and their supporting plates 202 with strips 208 at opposite sides of such plates. The plates are supported from such strips for sliding movement by pins 202' slidably engaging the upper sides of such strips. The outer ends of these strips will be carried by crosspieces 208' secured to the lower ends of chains 205. The inner ends of these strips have end pieces projecting upward from them. In such end pieces are slots 209, receiving pins 210 mounted on the frame 190 of the carriage, forming a connection enabling the inner ends of the strips 208 as well as their outer ends to move vertically upward from a lower mounting position. As the stack of sheets is raised, therefore, the upper surface of the upper sheet will always engage the strips 208 and may lift them to some extent. By such engagement of the sheet with the strips, proper disposition of the sheet edge engaging blocks 201 with the edge of the upper sheet will always be assured.

The clamping action of the blocks 201 against the opposite edges of the uppermost sheet of the stack is accomplished by relative approach movement of the side bars 200 backing the plates 202. When the regulating handle of latch plate 69 has been set in accordance with the width and location desired of the sheets to be fed, the initial clamping movement of the blocks 201 will be effected by bodily movement of the racks 4 and 41 and of the side bars 200 carried by them. Such initial clamping movement will involve approach movement of the side bars 200 so as to space the clamping blocks 201 apart a distance slightly in excess of the actual width of the sheet to be fed. Such movement may also involve shifting the sheet on top of the stack bodily in one direction or the other transversely of the direction of sheet feed if the sheet is to be fed in an offset direction. Movement of the racks 4 and 41 will not move the clamping blocks 201 together far enough to clamp the sheet tightly however.

After the sheet on top of the stack has been located in approximately the desired position to be fed by reciprocation of the racks 4 and 41, the side bars 200 are moved toward each other an additional small amount to effect the actual tight clamping of the sheet edges by the blocks 201. To effect this action, one of the side bars 200 carries at locations spaced lengthwise of it corresponding to the spacing between racks 4 auxiliary clamping actuators 211. These actuators are of the fluid-operated type and are shown as including a cylinder secured to the side bar 200 and a plunger rod 212 secured to a rack bar 4. These actuators are preferably of the pneumatic type.

In FIGURE 26, a situation is illustrated in which a stack of panels narrower than the maximum width stack is to be fed in a position offset always in the same direction from center feed. Consequently, this narrower stack has been placed on the elevator 17 in an offset position as indicated by dot-dash lines. The feed control lever will, therefore, be set relative to latch plate 69 so that the pneumatic actuator 211 would occupy approximately the position shown in dot-dash lines when the racks have been moved into feed position. Whether the racks have positioned the actuators 211, as shown in full lines or in dot-dash lines in FIGURE 26, the subsequent operation for effecting tight clamping of the sheet edges will be the same. Fluid under pressure supplied to the actuators will move them and the side bar 200 carrying them toward the sheet edge so as to press the block 201 carried by the plate 202 backed by the side bar tightly against the sheet edge. Such action will also insure that the sheet will be pressed tightly against the clamping blocks 201 backed by the opposite side bar 200. As thus firmly gripped between the clamping blocks 201 the sheet will be shifted lengthwise with the carriage composed of frame 190 and its associated parts as it is moved in the direction of sheet movement.

The mechanism for effecting reciprocation of the carriage along the tracks 193 reacts between the frame structure and a plate 198 securely anchored to the central portion of the frame 190. The actuator 213 for effecting reciprocation of the carriage is of the fluid pressure piston-and-cylinder type and preferably is pneumatic. One end of such actuator is connected by mounting arms 214 to a cross beam 194 and the opposite end of the actuator is pivotally connected to the thrust plate 198 by a yoke 215. As fluid under pressure is supplied to the actuator to extend it, a thrust will be exerted toward the left, as seen in FIGURE 23, to move the carriage and the top sheet of the stack clamped by the blocks 201 to advance the sheet to the left into engagement with the pinch rolls 180 and 181. Upon release of the sheet by retraction of the pinching actuators 211, the sheet may then be fed on to the left by rotation of the pinch rolls.

To regulate the operation of the feed mechanism to handle sheets of varying thickness, the sensing member 124' can be adjusted vertically. For this purpose, such sensing member is mounted slidably in the lower end of rack 220. A shaft 221 carries a pinion 222 meshing with such rack. The shaft 221 may be turned by swinging a handle 223 secured to it for the purpose of raising and lowering the rack 220 by rotation of the pinion 222. When the sensing member 124' has thus been raised or lowered to the desired position, the handle may be secured in position by a spring-pressed pin engaging in a hole of latch plate 224.

The stroke of the carriage for feeding the sheet lengthwise can be terminated automatically at opposite ends of the carriage stroke. For this purpose, a limit switch 225 is mounted on a cross beam 195 of the machine frame to be engaged by adjustable stops 226 and 227 which are mounted on the carriage frame 190. When the actuator 213 is energized to effect a feeding movement of the carriage, the stop 226 will be moved by the carriage until it engages the arm of limit switch 225 in the manner shown in FIGURE 25. Such engagement may effect automatically reversal of flow of fluid under pressure to the actuator 213 so that the carriage travel will be reversed and, when the return stroke has been completed, the stop 227 will engage the limit switch 225 to terminate return movement of the carriage. It will be understood, of course, that actuation of the limit switch 225 by engagement of stop 226 with it should also effect operation of the sheet-clamping actuators 221 to release the sheet before the return movement of the carriage is initiated. The stops can be adjusted to establish precisely the position of the carriage at opposite ends of the stroke.

In order to provide steady movement of the sheet in flat condition by the pinch rolls 180 and 181, a hold-down plate 230 may be used at the discharge side of the pinch rolls. This plate is mounted on the swinging end of the forwardly and downwardly inclined arm 231 which is pivotally supported on shaft 232, as shown in FIGURE 23.

I claim as my invention:

1. Panel-positioning mechanism comprising two panel edge-engaging members disposed in spaced relationship for engaging opposite edges, respectively, of panels to be positioned, means mounting each of said members for movement toward the other, two fluid pressure actuating means operatively connected, respectively, to said panel edge-engaging members, each of said fluid pressure actuating means including a first piston-and-cylinder actuator, a second piston-and-cylinder actuator mounted for movement by said first piston-and-cylinder actuator, and a member connected to its corresponding panel edge-engaging member and movable by both of said first and second actuators, in an amount corresponding to the combined movement thereof, means operable to supply fluid under pressure to said actuators, and control means for said fluid supply means operable to effect supply of fluid thereby simultaneously to the second actuator of each of said actuating means and to the first actuator of only one of said actuating means for moving said panel-engaging members to position a panel.

2. Panel-positioning mechanism comprising two panel edge-engaging members disposed in spaced relationship for engaging opposite edges, respectively, of panels to be positioned, means mounting each of said members for movement toward the other, two fluid pressure actuating means operatively connected, respectively, to said panel edge-engaging members, each of said fluid pressure actuating means including a first piston-and-cylinder actuator, a second piston-and-cylinder actuator moved by said first piston-and-cylinder actuator, and a member connected to its corresponding panel edge engaging member and movable by both of said first and second actuators, in an amount corresponding to the combined movement thereof, and means operable to supply fluid under pressure simultaneously to the second actuator of each of said actuating means and in alternate sequence first to one and then to the other of the first actuators of said actuating means for moving said panel-engaging members to position alternate panels engaged thereby in alternate predetermined positions.

3. The panel-positioning mechanism defined in claim 2, and stop means engageable by the member of each fluid pressure actuating means connected to the corresponding panel edge-engaging member and operable to limit movement first of one such member and then of the other such member corresponding to the fluid pressure actuating means the first actuator of which receives fluid under pressure.

4. The panel-positioning mechanism defined in claim 3, and means operable to adjust the position of the stop means depending upon the width of panels being positioned.

5. Panel-feeding mechanism for feeding panels edgewise one at a time from a stack of panels raised by elevator means into a position locating the top panel of such stack at a predetermined level, comprising control means for deenergizing the elevator means, squaring means engageable with an edge of the top panel of such stack and operable to shift such panel edgewise into a predetermined position for feeding, feed means operable to engage an edge of the top panel of such stack at such predetermined level and shift such panel edgewise off the stack, sensing means engageable by the top panel of such stack moving upward to such predetermined level, and means operable automatically by said sensing means moved by such top panel to actuate said control means for deenergizing the elevator means, to effect operation of said squaring means and to initiate operation of said feed means.

6. Panel feeding mechanism comprising supporting means operable to support a stack of panels, feed means operable to move the top panel in a given direction off the stack, first means engageable with one edge of the top panel of such stack disposed generally parallel to such given direction, drive means for moving said first means transversely of such given direction to shift such panel transversely to such edge into alignment with a first predetermined path of movement parallel to such edge and such given direction, second means engageable with the opposite edge of the new top panel and movable by said drive means transversely of such given direction and opposite to such direction of movement of said first means to shift such new top panel transversely of its edge engaged by said second means in the direction opposite that in which the first top panel was shifted by said first means and into alignment with a second predetermined path of movement parallel to the panel edge engaged by said second means and spaced from such predetermined path of movement a considerable distance transversely of such given direction, said feed means being operable to move such new top panel edgewise along such second predetermined path of movement off the stack, and means operable automatically to actuate said drive means for moving said first means and said second means in alternate sequence.

7. Panel feeding mechanism comprising supporting means operable to support a stack of panels, feed means operable to move the top panel in a given direction off the stack, and squaring means engageable with an edge of the top panel of such stack disposed generally parallel to such given direction including parallel spaced arms reciprocable lengthwise conjointly transversely of such given direction, a drive bar extending transversely of said arms, means interconnecting said drive bar and each of said arms and operable to effect conjoint reciprocation of said arms in the same direction by lengthwise movement of said drive bar, and means operable to effect lengthwise movement of said drive bar.

8. Panel-positioning mechanism comprising engaging members disposed to engage opposite edges, respectively, of panels to be positioned, two actuators connected respectively to said panel edge-engaging members, each operable to move its panel edge-engaging member for shifting edgewise a panel engaged thereby, separate adjustable stop means engageable respectively by said actuators to limit movement of said actuators and of said edge-engaging members moved thereby, and a single adjusting means operatively connected to both of said stop means and movable for shifting both of said stop means simultaneously and to the same extent for positioning panels of different widths in different predetermined positions.

9. Panel-positioning mechanism comprising two spaced engaging members disposed to engage the opposite edges, respectively, of a panel located therebetween to clamp the same, two separate actuating means operatively connected respectively to said two engaging members, and control means connected to said two actuating means and operable to effect movement of one of said actuating means through a given distance and movement of the other of said actuating means through a different distance to shift said engaging members through correspondingly different distances for location of such panel edges in predetermined positions.

10. Panel feeding mechanism comprising supporting means operable to support a stack of panels, feed means operable to move the top panel in a given direction off the stack, and squaring means including two movable blades respectively engageable with opposite edges of the top panel of such stack, two blade mounting means carrying said blades, respectively, and movable in opposite directions to effect approach movement of said blades, drive means connected to said blade mounting means and including a separate fluid pressure actuator for each of said blade mounting means, means operable to supply pressure fluid to said fluid pressure actuators, and control means for said pressure fluid supply means operable to effect a supply of fluid under pressure automatically to said fluid pressure actuators in alternate sequence.

References Cited in the file of this patent

UNITED STATES PATENTS

| | | |
|---|---|---|
| 565,615 | Grossman | Aug. 11, 1896 |
| 1,863,465 | Borrowdale | June 14, 1932 |
| 2,467,493 | Pabich | Apr. 19, 1949 |
| 2,490,085 | Nordquist et al. | Dec. 6, 1949 |
| 2,565,207 | Demler | Aug. 21, 1951 |
| 2,626,147 | Gjostein | Jan. 20, 1953 |